US009195260B2

(12) United States Patent
Matsuyama et al.

(10) Patent No.: US 9,195,260 B2
(45) Date of Patent: *Nov. 24, 2015

(54) SEMICONDUCTOR DEVICE, RADIO COMMUNICATION TERMINAL USING SAME, AND CLOCK FREQUENCY CONTROL METHOD

(71) Applicant: Renesas Mobile Corporation, Tokyo (JP)

(72) Inventors: Tsugio Matsuyama, Tokyo (JP); Kohei Wakahara, Tokyo (JP); Masaki Fujigaya, Tokyo (JP); Takahiro Irita, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,068

(22) Filed: Dec. 22, 2014

(65) Prior Publication Data
US 2015/0116010 A1 Apr. 30, 2015

Related U.S. Application Data

(63) Continuation of application No. 13/541,731, filed on Jul. 4, 2012, now Pat. No. 8,935,553.

(30) Foreign Application Priority Data

Jul. 6, 2011 (JP) .................................. 2011-149874

(51) Int. Cl.
*G06F 1/32* (2006.01)
*G06F 1/08* (2006.01)

(52) U.S. Cl.
CPC ........ *G06F 1/08* (2013.01); *G06F 1/324* (2013.01); *G06F 1/3225* (2013.01); *G06F 1/3287* (2013.01); *Y02B 60/1217* (2013.01); *Y02B 60/1282* (2013.01)

(58) Field of Classification Search
CPC .............................. G06F 1/3225; G06F 1/324
See application file for complete search history.

(56) References Cited

U.S. PATENT DOCUMENTS 5,167,024 A 11/1992 Smith et al.
5,860,106 A 1/1999 Domen et al.
(Continued)

FOREIGN PATENT DOCUMENTS

JP 11-184554 A 7/1999
JP 11-219237 A 8/1999
(Continued)

OTHER PUBLICATIONS

Office Action for U.S. Appl. No. 13/543,118 (mailed Jul. 28, 2014).
(Continued)

*Primary Examiner* — Albert Wang
(74) *Attorney, Agent, or Firm* — Miles & Stockbridge P.C.

(57) ABSTRACT

A semiconductor device 1 includes a clock generation circuit 15 that changes a frequency of an output clock signal according to a control signal div, an arithmetic circuit (e.g., CPU0) that operates according to the clock signal, a storage circuit (e.g., IC0) that is activated according to access from the arithmetic circuit CPU0, a memory access detection unit 12 that detects a number of accesses from the arithmetic circuit CPU0 to the storage circuit IC0, and when the number of accesses increases, outputs a request signal (e.g., psreq1), and a clock control circuit 14 that generates the control signal div for lowering the frequency of the clock signal according to the request signal psreq1.

4 Claims, 30 Drawing Sheets

(56) References Cited

U.S. PATENT DOCUMENTS

| | | | |
|---|---|---|---|
| 5,996,083 | A | 11/1999 | Gupta et al. |
| 6,073,244 | A | 6/2000 | Iwazaki |
| 6,088,808 | A | 7/2000 | Iwamura et al. |
| 6,601,177 | B1 | 7/2003 | Fujigaya et al. |
| 7,096,145 | B2 | 8/2006 | Orenstien et al. |
| 7,111,178 | B2 | 9/2006 | Rusu et al. |
| 7,171,570 | B2 | 1/2007 | Cox et al. |
| 7,469,355 | B1 | 12/2008 | Chong |
| 7,600,141 | B2 | 10/2009 | Flynn |
| 7,646,197 | B2 | 1/2010 | Misaka et al. |
| 7,657,764 | B2 | 2/2010 | Jorgenson et al. |
| 8,499,182 | B2 | 7/2013 | Fujigaya |
| 8,756,442 | B2 | 6/2014 | Naffziger et al. |
| 2002/0083354 | A1* | 6/2002 | Adachi .......................... 713/322 |
| 2008/0307240 | A1 | 12/2008 | Dahan et al. |
| 2012/0254595 | A1 | 10/2012 | Wu et al. |
| 2012/0262143 | A1 | 10/2012 | Yamamoto |

FOREIGN PATENT DOCUMENTS

| | | | |
|---|---|---|---|
| JP | 2000-23355 | A | 1/2000 |
| JP | 2003-140768 | A | 5/2003 |
| JP | 2003-298413 | A | 10/2003 |
| JP | 2005-196430 | A | 7/2005 |
| JP | 2005-234968 | A | 9/2005 |
| JP | 2007-220148 | A | 8/2007 |
| JP | 2009-106097 | A | 5/2009 |
| JP | 2011-059867 | A | 3/2011 |
| WO | 2011/074059 | A1 | 6/2011 |

OTHER PUBLICATIONS

Non-Final Office Action for U.S. Appl. No. 13/543,118 (mailed Feb. 26, 2014).

U.S. Appl. No. 13/543,118, filed Jul. 6, 2012.

Office Action mailed Dec. 31, 2014 for related U.S. Appl. No. 13/543,118.

Office Action for related Japanese Application No. 2011-149874, mailed Jun. 9, 2015.

Office Action for related Japanese Application No. 2011-149875, mailed Jul. 7, 2015.

* cited by examiner

| d[2:0] || div0[4:0] ||
|---|---|---|---|
| VALUE | FREQUENCY-DIVISION RATIO | VALUE | CLOCK NUMBER |
| 3'h0 | 1 | 5'h10 | 16/16 |
| 3'h1 | 2 | 5'h08 | 8/16 |
| 3'h2 | 4 | 5'h04 | 4/16 |
| 3'h3 | 8 | 5'h02 | 2/16 |
| 3'h4 | 16 | 5'h01 | 1/16 |

Fig. 13A

| div1[4:0], div2[4:0] ||
|---|---|
| VALUE | CLOCK NUMBER |
| 5'h10 | 16/16 |
| 5'h0F | 15/16 |
| 5'h0E | 14/16 |
| 5'h0D | 13/16 |
| 5'h0C | 12/16 |
| 5'h0B | 11/16 |
| 5'h0A | 10/16 |
| 5'h09 | 9/16 |
| 5'h08 | 8/16 |
| 5'h07 | 7/16 |
| 5'h06 | 6/16 |
| 5'h05 | 5/16 |
| 5'h04 | 4/16 |
| 5'h03 | 3/16 |
| 5'h02 | 2/16 |
| 5'h01 | 1/16 |
| 5'h00 | 0/16 |

Fig. 13B

| div2[4:0] | | cpvld[15:0] | ckmode[1:0] |
|---|---|---|---|
| VALUE | CLOCK NUMBER | VALUE | VALUE |
| 5'h10 | 16/16 | 16'hFFFF | 2'b00 |
| 5'h0F | 15/16 | 16'hFFFE | 2'b00 |
| 5'h0E | 14/16 | 16'hFEFE | 2'b00 |
| 5'h0D | 13/16 | 16'hFEEE | 2'b00 |
| 5'h0C | 12/16 | 16'hEEEE | 2'b00 |
| 5'h0B | 11/16 | 16'hEEEA | 2'b00 |
| 5'h0A | 10/16 | 16'hEAEA | 2'b00 |
| 5'h09 | 9/16 | 16'hEAAA | 2'b00 |
| 5'h08 | 8/16 | 16'hAAAA | 2'b01 |
| 5'h07 | 7/16 | 16'hAB56 | 2'b01 |
| 5'h06 | 6/16 | 16'hB6B6 | 2'b01 |
| 5'h05 | 5/16 | 16'hDB6C | 2'b01 |
| 5'h04 | 4/16 | 16'hCCCC | 2'b01 |
| 5'h03 | 3/16 | 16'hE738 | 2'b01 |
| 5'h02 | 2/16 | 16'hF0F0 | 2'b01 |
| 5'h01 | 1/16 | 16'hFF00 | 2'b01 |
| 5'h00 | 0/16 | 16'h0000 | 2'b01 |

Fig. 13C

SEMICONDUCTOR DEVICE, RADIO COMMUNICATION TERMINAL USING SAME, AND CLOCK FREQUENCY CONTROL METHOD

CROSS-REFERENCE TO RELATED APPLICATIONS

This application is based upon and claims the benefit of priority from Japanese patent application No. 2011-149874, filed on Jul. 6, 2011, the disclosure of which is incorporated herein in its entirety by reference.

BACKGROUND

The present invention relates to a semiconductor device, a radio communication terminal using the semiconductor device, and a clock frequency control method.

Recent years, the development of a SoC (System-on-a-Chip) technique that enables circuits capable of providing a plurality of functions to be integrated into one semiconductor chip is in progress. Further, in semiconductor devices using this SoC technique, there are trends to use a multi-core CPU (Central Processing Unit) and to increase the frequency of an operating clock signal.

Incidentally, Japanese Unexamined Patent Application Publication Nos. 11-219237, 11-184554 and 2003-140768 disclose a technique to reduce the power consumption by lowering the frequency of the operating clock signal when, for example, the rate of the operation of the CPU is low.

SUMMARY

The inventors of this application have found various problems to be solved in the development of semiconductor devices. Each embodiment disclosed in this application provides, for example, a semiconductor device suitable for a radio communication terminal and the like. More detailed features will become obvious from descriptions of this specification and attached drawings.

An aspect disclosed in this specification includes a semiconductor device and the semiconductor device includes a memory access detection unit.

According to the present invention, it is possible to provide an excellent semiconductor device suitable for, for example, a radio communication terminal and the like.

BRIEF DESCRIPTION OF THE DRAWINGS

The above and other aspects, advantages and features will be more apparent from the following description of certain embodiments taken in conjunction with the accompanying drawings, in which:

FIG. 13A is a table showing a relation between a digital signal d[2:0] and a digital signal div0[4:0];

FIG. 13B is a table showing values that a 5-bit digital signal div1[4:0] can take on;

FIG. 13C is a table showing a relation among a digital signal div2[4:0], a pulse valid signal cpvld[15:0], and a mode signal ckmode[1:0];

DETAILED DESCRIPTION

Specific embodiments to which the present invention is applied are explained hereinafter in detail with reference to the drawings. However, the present invention is not limited to the embodiments shown below. Further, the following descriptions and the drawings are simplified as appropriate for clarifying the explanation.

<First Embodiment>

Figure 1A:
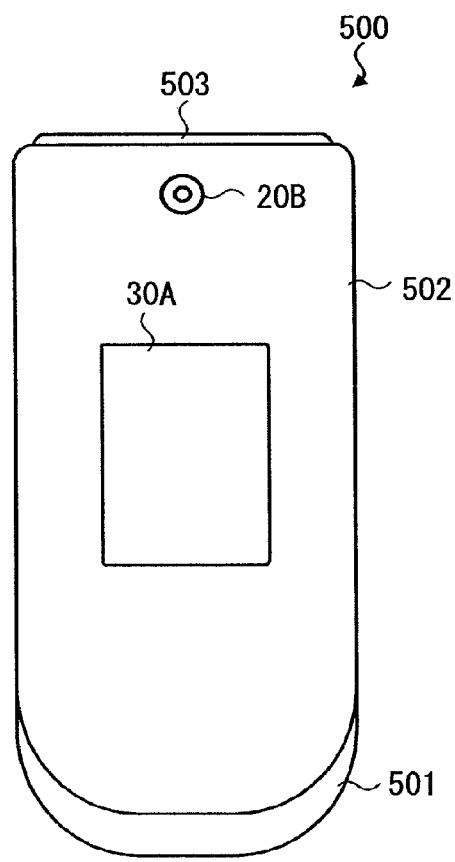
FIG. 1A is an external view showing a configuration example of a radio communication terminal 500.
Figure 1B:
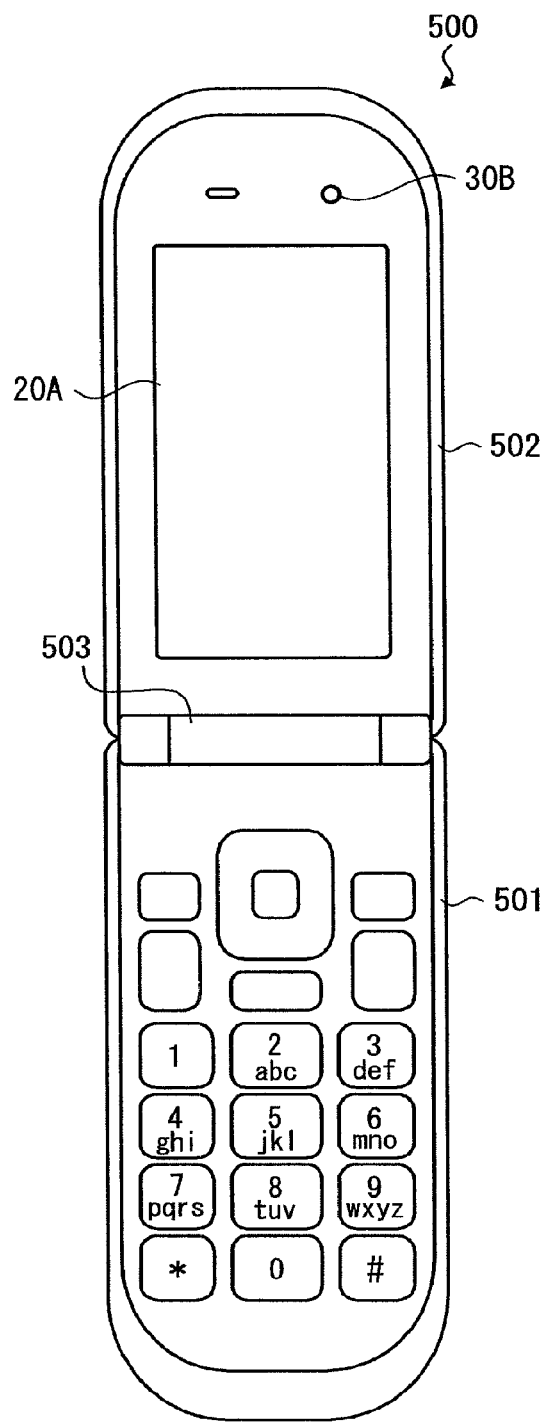
FIG. 1B is an external view showing a configuration example of a radio communication terminal 500.
Figure 2:
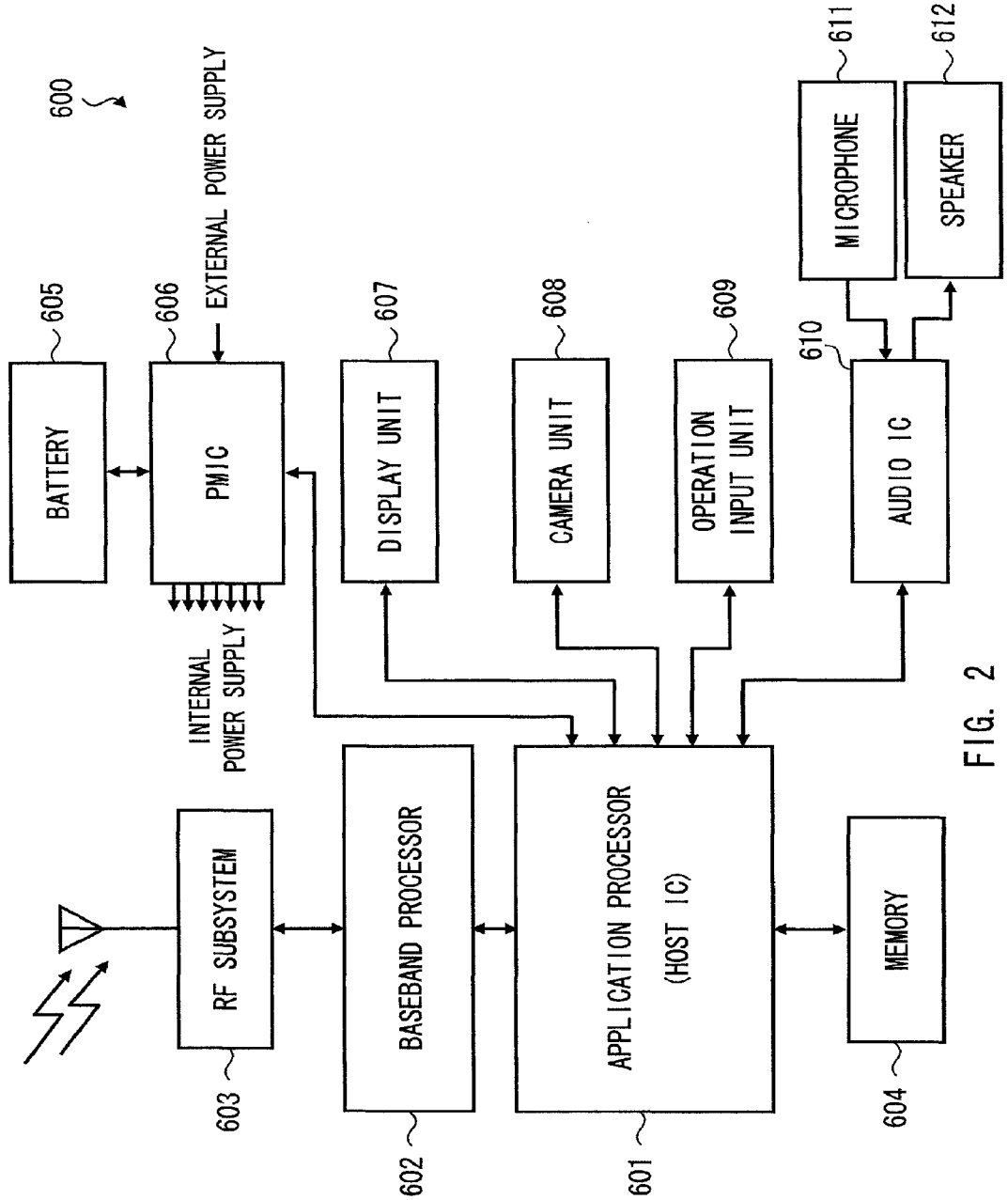
FIG. 2 is a block diagram showing a configuration example of an electronic device 600 according to a first embodiment.

Firstly, an outline of a radio communication terminal, which is a preferable electronic device to which a semiconductor device according to this embodiment is applied, is explained with reference to FIGS. 1A, 1B and 2. FIGS. 1A and 1B are external views showing a structural example of a radio communication terminal 500. Note that the structural example shown in FIGS. 1A, 1B and 2 shows a case where the radio communication terminal 500 is a folding-type mobile phone terminal. However, the radio communication terminal 500 may be other radio communication terminals such as a smart phone, a potable game terminal, a tablet PC (Personal Computer), and a laptop PC. Further, needless to say, the semiconductor device according to this embodiment can be also applied to devices other than the radio communication terminals.

FIG. 1A shows a closed state (folded state) of a radio communication terminal 500 which is a folding-type mobile phone terminal. FIG. 1B shows an opened state of the radio communication terminal 500. The radio communication terminal 500 has such a structure that a first housing 501 is connected to a second housing 502 through a hinge 503. In the example shown in FIGS. 1A and 1B, a plurality of buttons are arranged on the first housing 501. Meanwhile, the second housing 502 includes two display devices 20A and 30A and two camera devices 20B and 30B. Each of the display devices 20A and 30A is an LCD (Liquid Crystal Display), an OLED (Organic Light-Emitting Diode), or the like.

The display device 20A is disposed in such a manner that its display surface is positioned on the inside main surface (front surface) of the second housing 502. That is, the display device 20A is a main display that is viewed by a user when the user operates the radio communication terminal 500 in an opened state. On the other hand, the display device 30A is a sub display that is disposed in such a manner that its display surface is positioned on the outside main surface (rear surface) of the second housing 502.

The camera device 20B is a main camera that is disposed in such a manner that its lens unit is positioned on the outside main surface (rear surface) of the second housing 502. On the other hand, the camera device 30B is a sub camera that is disposed in such a manner that its lens unit is positioned on the inside main surface (front surface) of the second housing 502.

Next, a configuration of an electronic device 600 in which a semiconductor device according to the present invention is installed is explained with reference to FIG. 2. FIG. 2 is a block diagram showing a configuration example of an electronic device 600 according to a first embodiment of the present invention. The electronic device 600 is installed, for example, inside the radio communication terminal 500 shown in FIGS. 1 and 1B. As shown in FIG. 2, the electronic device 600 includes an application processor 601, a baseband processor 602, an RF (Radio Frequency) subsystem 603, a memory 604, a battery 605, a power management IC (PMIC: Power Management Integrated Circuit) 606, a display unit 607, a camera unit 608, an operation input unit 609, an audio IC 610, a microphone 611, and a speaker 612.

The application processor 601 reads a program stored in the memory 604 and performs various processes to implement various functions of the electronic device 600. For example, the application processor 601 executes an OS (Operating System) program obtained from the memory 604 and also executes application programs that are executed on this OS program.

The baseband processor 602 performs a baseband process including an encoding process (e.g., error correction coding such as convolution coding and turbo coding) or a decoding process for data to be transmitted/received by an electronic terminal. More specifically, the baseband processor 602 receives transmission data from the application processor 601, performs an encoding process for the received transmission data, and transmits the encoded transmission data to the RF subsystem 603. Further, the baseband processor 602 receives reception data from the RF subsystem 603, performs a decoding process for the received reception data, and transmits the decoded reception data to the application processor 601.

The RF subsystem 603 performs a modulation process or a demodulation process for data to be transmitted/received by the electronic device 600. More specifically, the RF subsystem 603 generates a transmission signal by modulating transmission data received from the baseband processor 602 by a carrier wave, and outputs the transmission signal through an antenna. Further, the RF subsystem 603 receives a reception signal through an antenna, generates reception data by demodulating the reception signal by a carrier wave, and transmits the reception data to the baseband processor 602.

The memory 604 stores programs and data that are used by the application processor 601. Further, the memory 604 includes a nonvolatile memory which retains stored data even when the power supply is cut off, and a volatile memory in which stored data is cleared when the power supply is cut off.

The battery 605 is a battery and is used when the electronic device 600 operates without using the external power supply. Note that the electronic device 600 may use the battery 605 even when the external power supply is connected. Further, it is preferable that a secondary battery is used as the battery 605.

The power management IC 606 generates an internal power supply from the battery 605 or the external power supply. This internal power supply supplies electric power to each block of the electronic device 600. Note that the power management IC 606 controls the voltage of the internal power supply for each of the blocks that receive the internal power supply. The power management IC 606 controls the voltage of the internal power supply under instructions from the application processor 601. Further, the power management IC 606 can also control whether the internal power supply is supplied or cut off for each of the blocks. Further, when the external power supply is supplied, the power management IC 606 controls the charging to the battery 605.

The display unit 607 is, for example, a liquid crystal display device, and displays various images according to the process performed in the application processor 601. The images displayed in the display unit 607 include user interface images through which a user gives instructions to the electronic device 600, camera images, moving images, and the like.

The camera unit 608 obtains an image under instructions from the application processor. The operation input unit 609 is a user interface which is operated by a user and through which the user gives instructions to the electronic device 600. The audio IC 610 decodes audio data transmitted from the application processor 601 and thereby drives the speaker 612. Further, the audio IC 610 generates audio data by encoding audio information obtained from the microphone 611 and outputs the audio data to the application processor 601.

Next, a semiconductor device according to this embodiment is explained.

Figure 3:
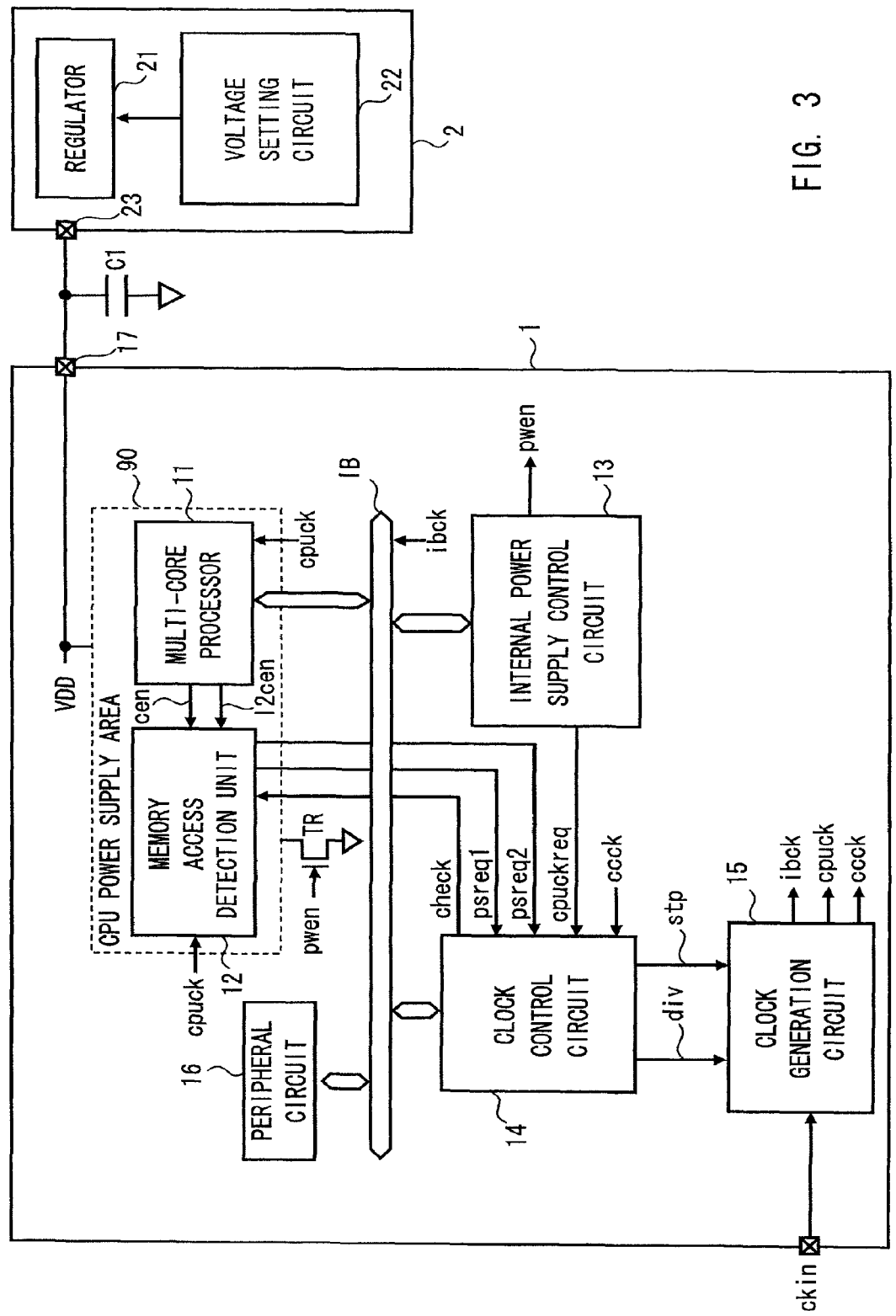
FIG. 3 is a block diagram showing a system including a semiconductor device 1 and a power supply device 2 according to a first embodiment.

FIG. 3 is a block diagram showing a system including a semiconductor device 1 and a power supply device 2 according to a first embodiment. Note that the semiconductor device 1 shown in FIG. 3 corresponds to, for example, the application processor 601 shown in FIG. 2, and the power supply device 2 shown in FIG. 3 corresponds to the power management IC 606 shown in FIG. 2.

The semiconductor device 1 shown in FIG. 3 includes a multi-core processor 11, a memory access detection unit 12, an internal power supply control circuit 13, a clock control circuit 14, a clock generation circuit 15, and a peripheral circuit 16. Note that the semiconductor device 1 is, for example, a SoC.

The multi-core processor 11 includes a plurality of cores, a plurality of primary cache memories each of which is provided for respective one of the plurality of cores, and a secondary cache memory which is shared by the plurality of cores. The multi-core processor 11 performs various arithmetic processes. Further, a clock signal cpuck output from the clock generation circuit 15 is supplied to the multi-core processor 11. The multi-core processor 11 can perform data transmission/reception with other circuits through an internal bus IB. Details of the multi-core processor 11 are explained later with reference to FIG. 4.

The memory access detection unit 12 detects the number of activations (activation rate) of an enable signal cen that is output when each core of the multi-core processor 11 accesses the primary cache memory at regular intervals and an enable signal 12cen that is output when each core accesses the secondary cache memory, i.e., detects the number of accesses. Further, the memory access detection unit 12 calculates an estimated current consumption in the multi-core processor 11 based on the number of activations of the enable signals cen and 12cen. When this estimated current consumption exceeds a predetermined reference value, the memory access detection unit 12 outputs a request signal psreq1 for requesting a reduction of the frequency of the clock signal cpuck supplied to the multi-core processor 11, to the clock control circuit 14. Further, when the variation of this estimated current consumption exceeds a predetermined reference value, the memory access detection unit 12 outputs a request signal psreq2 for requesting a reduction of the frequency of the clock signal cpuck supplied to the multi-core processor 11, to the clock control circuit 14. Details of the memory access detection unit 12 are explained later with reference to FIG. 6.

Note that, as shown in FIG. 3, the multi-core processor 11 and the memory access detection unit 12 are located in a CPU power supply area 90 in which the same power supply voltage is supplied. A high-potential-side power supply voltage VDD is supplied to the CPU power supply area 90 from the power supply device 2 through a terminal 17. Further, the CPU power supply area 90 is connected to a low-potential-side power supply (e.g., ground) through a transistor TR which is a switch. That is, when the transistor TR becomes an on-state (conduction state), electric power is supplied to the multi-core processor 11 and the memory access detection unit 12. The on/off of the electric power supplied to the CPU power supply area 90, i.e., the on/off of the transistor TR is controlled by a control signal pwen output from the internal power supply control circuit 13.

The internal power supply control circuit 13 outputs the control signal pwen for controlling the on/off of the power supply to the multi-core processor 11, to the gate of the transistor TR. Further, the internal power supply control circuit 13 also outputs a request signal cpuckreq for requesting a clock supply to the multi-core processor 11, to the clock control circuit 14. The internal power supply control circuit 13 is connected to the internal bus IB. Note that a clock signal ibck output from the clock generation circuit 15 is supplied to the internal bus IB.

The clock control circuit 14 is a circuit that controls the clock generation circuit 15. The clock control circuit 14 is connected to the internal bus IB. The clock control circuit 14 outputs an execution signal check, which is used by the memory access detection unit 12 to detect the activation rate, to the memory access detection unit 12 at regular intervals.

Further, the clock control circuit 14 outputs a frequency-division control signal div according to the request signals psreq1 and psreq2 output from the memory access detection unit 12, to the clock generation circuit 15. Further, the clock control circuit 14 outputs a stop control signal stp according to the request signal cpuckreq output from the internal power supply control circuit 13, to the clock generation circuit 15. That is, when the request signal cpuckreq is output from the internal power supply control circuit 13, the clock control circuit 14 outputs the stop control signal stp for cancelling the stop of the clock signal cpuck. As a result, the clock generation circuit 15 starts outputting the clock signal cpuck.

The clock generation circuit 15 is a circuit that generates a clock signal cpuck supplied to the multi-core processor 11, a clock signal ibck supplied to the internal bus IB, and a clock signal ccck supplied to the clock control circuit 14. Further, the clock generation circuit 15 can change the frequency of the clock signal cpuck supplied to the multi-core processor 11 based on the frequency-division control signal div output from the clock control circuit 14. Further, the clock generation circuit 15 stops or starts outputting each clock signal based on the stop control signal stp output from the clock control circuit 14. Details of the clock control circuit 14 and the clock generation circuit 15 are explained later.

The peripheral circuit 16 is a circuit that is used by the multi-core processor 11. Examples of the peripheral circuit 16 include a timer unit, a watchdog timer unit, a DMA (Direct Memory Access) unit, a low voltage detection unit, and a power-on reset (POR) unit. The peripheral circuit 16 is connected to the multi-core processor 11 through the internal bus IB.

As described above, the semiconductor device 1 according to this embodiment includes the memory access detection unit 12 that can detect the number of accesses from each core to each memory area and thereby estimate the current consumption of the multi-core processor 11. Therefore, when this estimated current consumption or its variation exceeds a predetermined reference value, the semiconductor device 1 can automatically lower the frequency of the clock signal cpuck supplied to the multi-core processor 11. As a result, it is possible to prevent the malfunction that would otherwise occur when the current value exceeds the permissible current value. Further, it is also possible to effectively prevent the voltage drop that would be otherwise caused by a sudden increase of the current consumption.

Note that although the processor is a multi-core processor in this embodiment, the present invention can be also applied to a single-core processor as explained later in a fifth embodiment. In the meantime, it is rare that the operation rates of a plurality of cores increase at the same time. Therefore, it is undesirable to increase the permissible current value to cope with such rare situations, because the increased permissible current value leads to increase in the chip size and in the cost.

In this embodiment, it is possible to control the current consumption by temporarily reducing the frequency of the clock signal supplied to the processor only when the operation rates of a plurality of cores increase at the same time, thereby eliminating the need to increase the permissible current value. That is, the present invention is suitable for use in multi-core processors.

Next, the power supply device 2 is explained. The power supply device 2 includes a regulator 21 and a voltage setting circuit 22. The power supply device 2 is, for example, an LSI for power supply. The regulator 21 can adjust a voltage output to a terminal 23 according to a control signal output from the voltage setting circuit 22. The power supply voltage output from the regulator 21 is supplied to the semiconductor device 1 through the terminal 23.

The voltage setting circuit 22 adjusts a voltage output from the regulator 21 according to, for example, a feedback signal from the semiconductor device 1 (not shown). Further, a bypass capacitor C1 is provided between the terminal 17 of the semiconductor device 1 and the terminal 23 of the power supply device 2.

Figure 4:
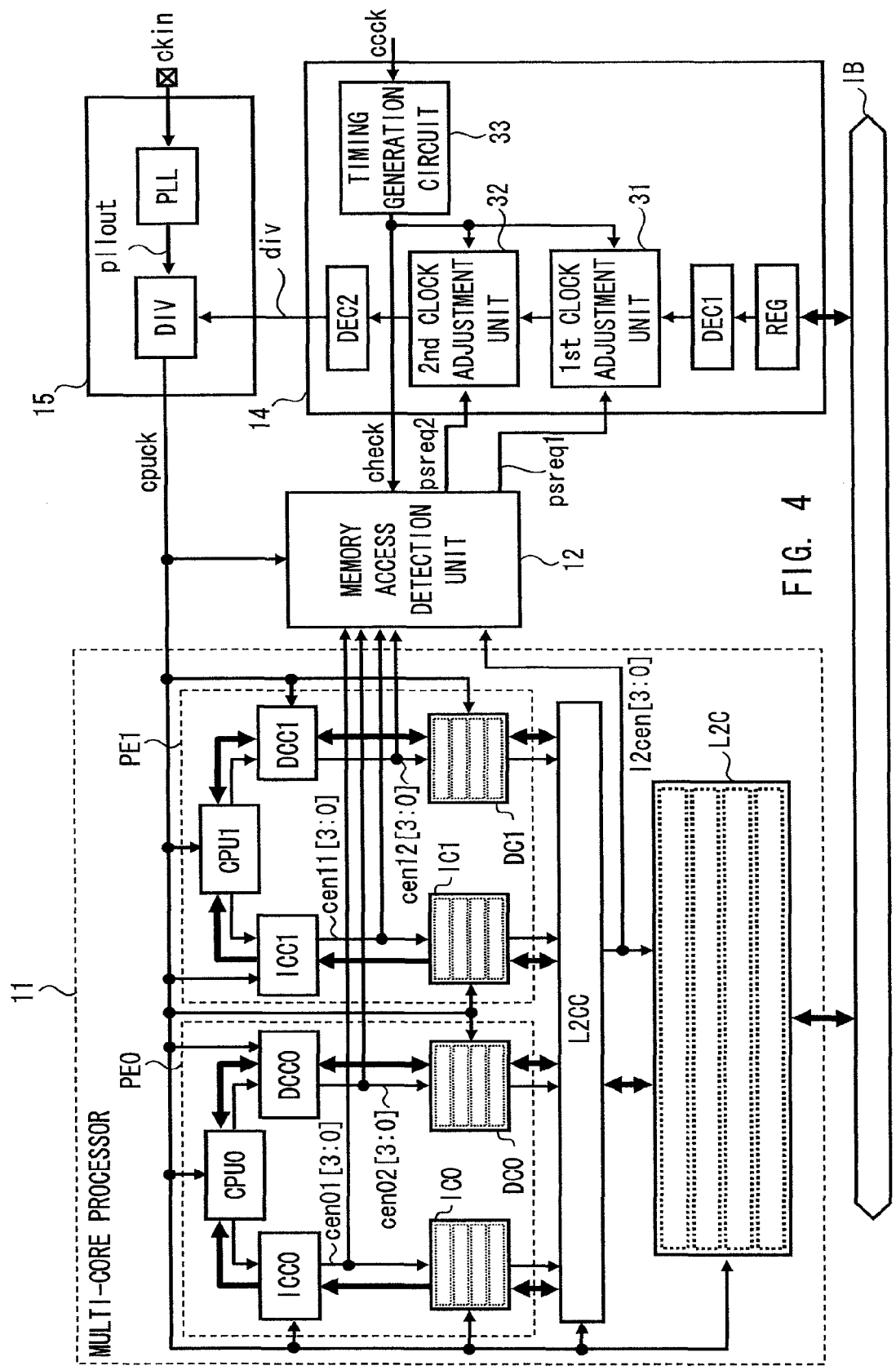
FIG. 4 shows a relation among a multi-core processor 11, a memory access detection unit 12, a clock control circuit 14, and a clock generation circuit 15 in a more detailed manner.

Next, the multi-core processor 11, the memory access detection unit 12, the clock control circuit 14, and the clock generation circuit 15 are explained in a more detailed manner with reference to FIG. 4. FIG. 4 shows a relation among the multi-core processor 11, the memory access detection unit 12, the clock control circuit 14, and the clock generation circuit 15 in a more detailed manner.

Firstly, the internal configuration of the multi-core processor 11 is explained. As shown in FIG. 4, the multi-core processor 11 includes two processor elements PE0 and PE1, a memory controller L2CC, and a secondary cache memory L2C.

Note that the processor element PE0 includes a core CPU0, memory controllers ICC0 and DCC0, an instruction cache memory IC0, and a data cache memory DC0. Similarly, the processor element PE1 includes a core CPU1, memory controllers ICC1 and DCC1, an instruction cache memory IC1, and a data cache memory DC1.

As shown in FIG. 4, a CPU clock signal cpuck output from the clock generation circuit 15 is input to each internal component of the multi-core processor 11 (cores CPU0 and CPU1, memory controller ICC0, ICC1, DCC0, DCC1 and L2CC, instruction cache memories IC0 and IC1, data cache memories DC0 and DC1, and secondary cache memory L2C). That is, each component operates according to the CPU clock signal cpuck.

The core CPU0 is an arithmetic circuit that serves as the core of the processor element PE0. The core CPU0 reads an instruction stored in the instruction cache memory IC0 through the memory controller ICC0. Specifically, the core CPU0 outputs an access request for the instruction cache memory IC0, to the memory controller ICC0. Then, the core CPU0 accesses the instruction cache memory IC0, which has been activated by the memory controller ICC0.

Further, the core CPU0 reads data stored in the data cache memory DC0 through the memory controller DCC0. Alternatively, the core CPU0 writes data into the data cache memory DC0. Specifically, the core CPU0 outputs an access request for the data cache memory DC0, to the memory controller DCC0. Then, the core CPU0 accesses the data cache memory DC0, which has been activated by the memory controller DCC0.

Further, the core CPU0 accesses the secondary cache memory L2C through the memory controller ICC0, the instruction cache memory IC0, and the memory controller L2CC. Alternatively, the core CPU0 accesses the secondary cache memory L2C through the memory controller DCC0, the data cache memory DC0, and the memory controller L2CC.

The memory controller ICC0 is a control circuit that controls the access to the instruction cache memory IC0. The memory controller ICC0 changes the signal level of an enable signal cen01, which is used to activate the instruction cache memory IC0, to an active level in response to an access request from the core CPU0. As a result, the instruction cache memory IC0 is activated.

The memory controller DCC0 is a control circuit that controls the access to the data cache memory DC0. The memory controller DCC0 changes the signal level of an enable signal cen02, which is used to activate the data cache memory DC0, to an active level in response to an access request from the core CPU0. As a result, the data cache memory DC0 is activated.

The instruction cache memory IC0 is a volatile semiconductor storage circuit which serves as the primary cache memory and in which instructions that are frequently used by the core CPU0 are temporarily stored. The data cache memory DC0 is a volatile semiconductor storage circuit which serves as the primary cache memory and in which data that are frequently used by the core CPU0 are temporarily stored. SRAMs (Static Random Access Memories) are often used for cache memories such as the instruction cache memory IC0 and the data cache memory DC0.

Figure 5:
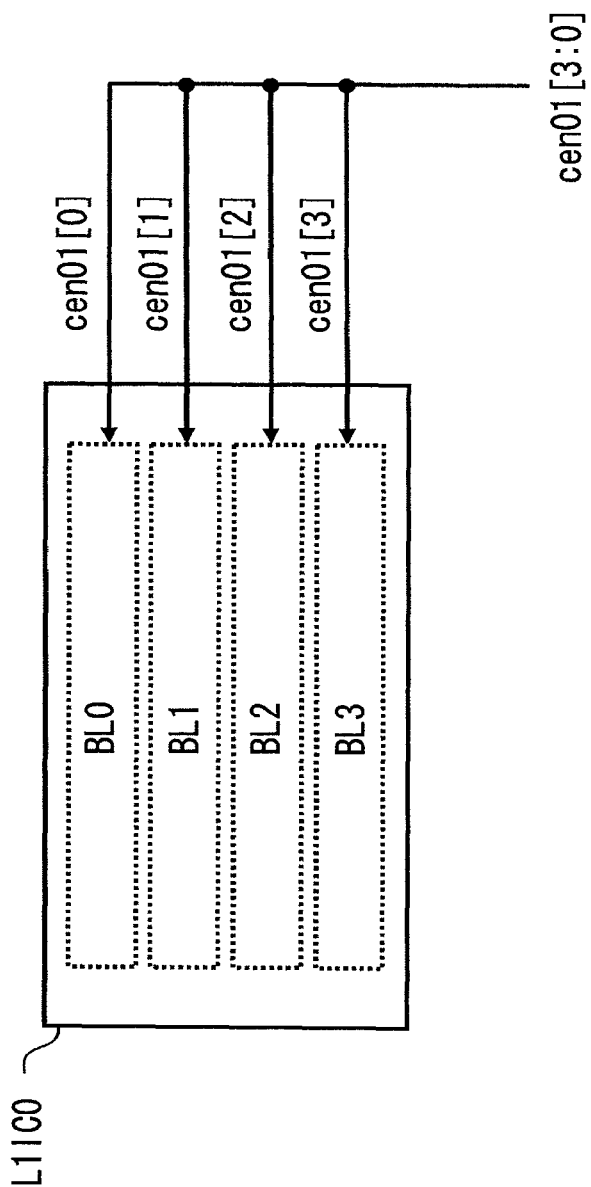
FIG. 5 is an enlarged view of an instruction cache memory IC0.

FIG. 5 is an enlarged view of the instruction cache memory IC0. As shown in FIG. 5, the instruction cache memory IC0 is composed of four blocks BL0 to BL3 that can be individually selected (activated) in this embodiment. Note that the blocks BL0 to BL3 are controlled by enable signals cen01[0] to cen01[3] respectively.

In other words, the enable signal cen01 is a 4-bit signal (cen01[3:0]) composed of cen01[0] for selecting the block BL0, cen01[1] for selecting the block BL1, cen01[2] for selecting the block BL2, and cen01[3] for selecting the block BL3. With this configuration, only the block in which a necessary instruction is stored is activated, thus making it possible to reduce the power consumption. This configuration can be generalized. That is, assuming that the instruction cache memory IC0 is composed of n blocks (n is a natural number) and each block can be individually activated, the number of bits of the enable signal cen01 should be also n. Note that the number n of blocks can be arbitrarily determined.

Further, similarly to the instruction cache memory IC0, each of the other cache memories (instruction cache memory IC1, data cache memories DC0 and DC1, and secondary cache memory L2C) is also composed of four individually-selectable blocks in this embodiment.

The core CPU1 is an arithmetic circuit that serves as the core of the processor element PE1. The core CPU1 reads an instruction stored in the instruction cache memory IC1 through the memory controller ICC1. Specifically, the core CPU1 outputs an access request for the instruction cache memory IC1, to the memory controller ICC1. Then, the core CPU1 accesses the instruction cache memory IC1, which has been activated by the memory controller ICC1.

Further, the core CPU1 reads data stored in the data cache memory DC1 through the memory controller DCC1. Alternatively, the core CPU1 writes data into the data cache memory DC1. Specifically, the core CPU1 outputs an access request for the data cache memory DC1, to the memory controller DCC1. Then, the core CPU1 accesses the data cache memory DC1, which has been activated by the memory controller DCC1.

Further, the core CPU1 accesses the secondary cache memory L2C through the memory controller ICC1, the instruction cache memory IC1, and the memory controller L2CC. Alternatively, the core CPU1 accesses the secondary cache memory L2C through the memory controller DCC1, the data cache memory DC1, and the memory controller L2CC.

The memory controller ICC1 is a control circuit that controls the access to the instruction cache memory IC1. The memory controller ICC1 changes the signal level of an enable signal cen11, which is used to activate the instruction cache memory IC1, to an active level in response to an access request from the core CPU1. As a result, the instruction cache memory IC1 is activated.

The memory controller DCC1 is a control circuit that controls the access to the data cache memory DC1. The memory controller DCC1 changes the signal level of an enable signal cen12, which is used to activate the data cache memory DC1, to an active level in response to an access request from the core CPU1. As a result, the data cache memory DC1 is activated.

The instruction cache memory IC1 is a volatile semiconductor storage circuit which serves as the primary cache memory and in which instructions that are frequently used by the core CPU1 are temporarily stored. The data cache memory DC1 is a volatile semiconductor storage circuit which serves as the primary cache memory and in which data that are frequently used by the core CPU1 are temporarily stored.

The memory controller L2CC is a control circuit that controls the access to the secondary cache memory L2C. The memory controller L2CC changes the signal level of an enable signal 12cen, which is used to activate the secondary cache memory L2C, to an active level in response to an access request from the core CPU0 or CPU1. As a result, the secondary cache memory L2C is activated.

The secondary cache memory L2C is a volatile semiconductor storage circuit in which instructions and data that are used less frequently by the core CPU0 and CPU1 than those stored in the primary cache memory are stored. Similarly to the primary cache memory such as the instruction cache memories IC0 and IC1 and the data cache memories DC0 and DC1, SRAMs are often used for the secondary cache memory L2C.

Next, the memory access detection unit 12 is explained. As shown in FIG. 4, the enable signals cen01, cen02, cen11, cen12 and 12cen, which are used to activate the instruction cache memories IC0 and IC1, the data cache memories DC0 and DC1, and the secondary cache memory L2C, are input to the memory access detection unit 12. The memory access detection unit 12 detects the number of activations (activation rate) of the input enable signals cen01, cen02, cen11, cen12 and 12cen, i.e., detects the number of accesses. Further, the memory access detection unit 12 calculates an estimated current consumption in the multi-core processor 11 based on the number of accesses. This process performed in the memory access detection unit 12 is repeatedly performed according to the execution signal check output by the clock control circuit 14.

Figure 6:
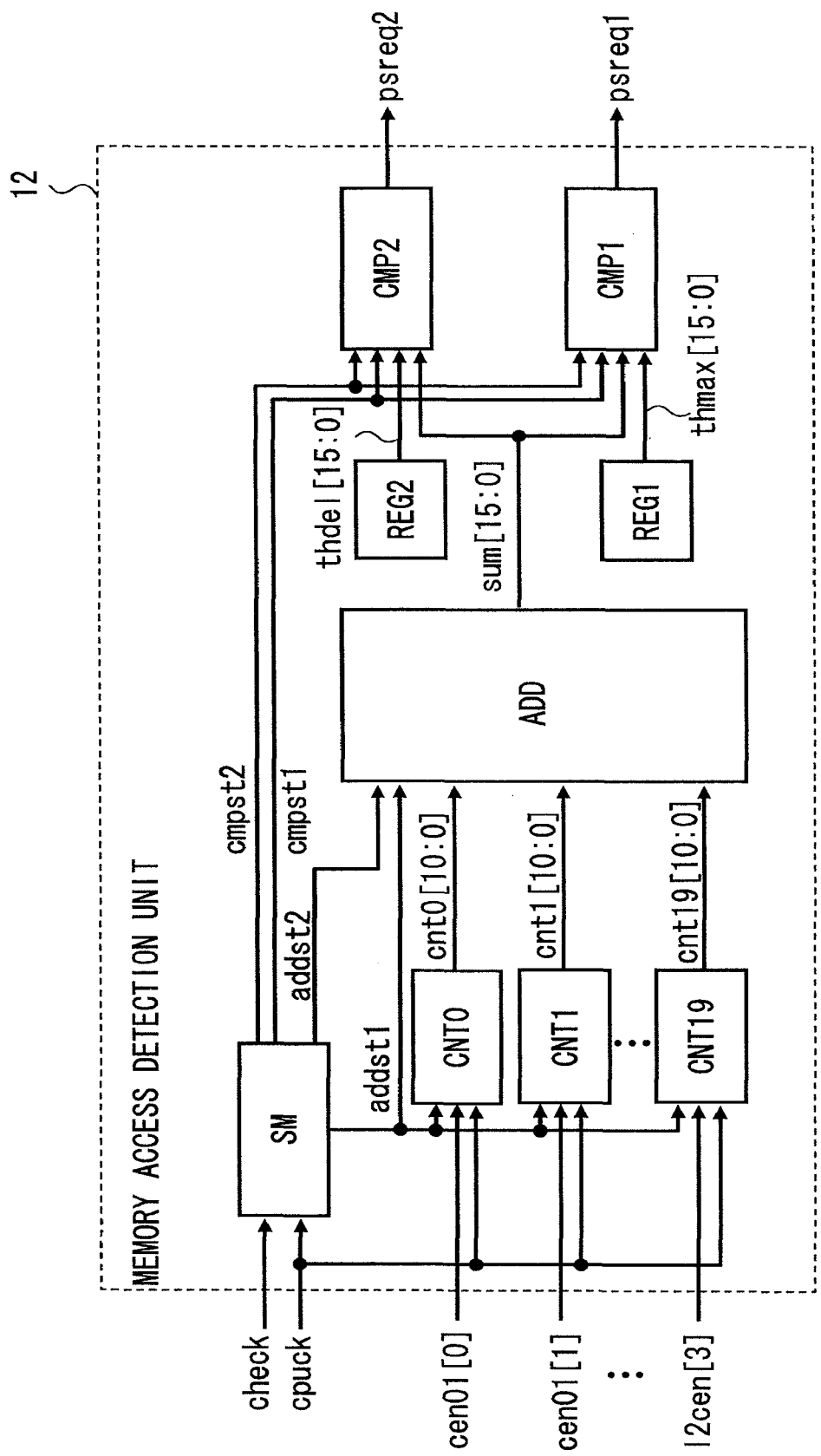
FIG. 6 is a block diagram showing an internal configuration of a memory access detection unit 12.

The memory access detection unit 12 is explained hereinafter in detail with reference to FIG. 6. FIG. 6 is a block diagram showing the internal configuration of the memory access detection unit 12. As shown in FIG. 6, the memory access detection unit 12 includes a state machine SM, twenty counters CNT0 to CNT19, an adder circuit ADD, registers REG1 and REG2, and digital comparators CMP1 and CMP2.

The state machine SM generates state signals addst1, addst2, cmpst1 and cmpst2 from the execution signal check and the clock signal cpuck.

Figure 7:
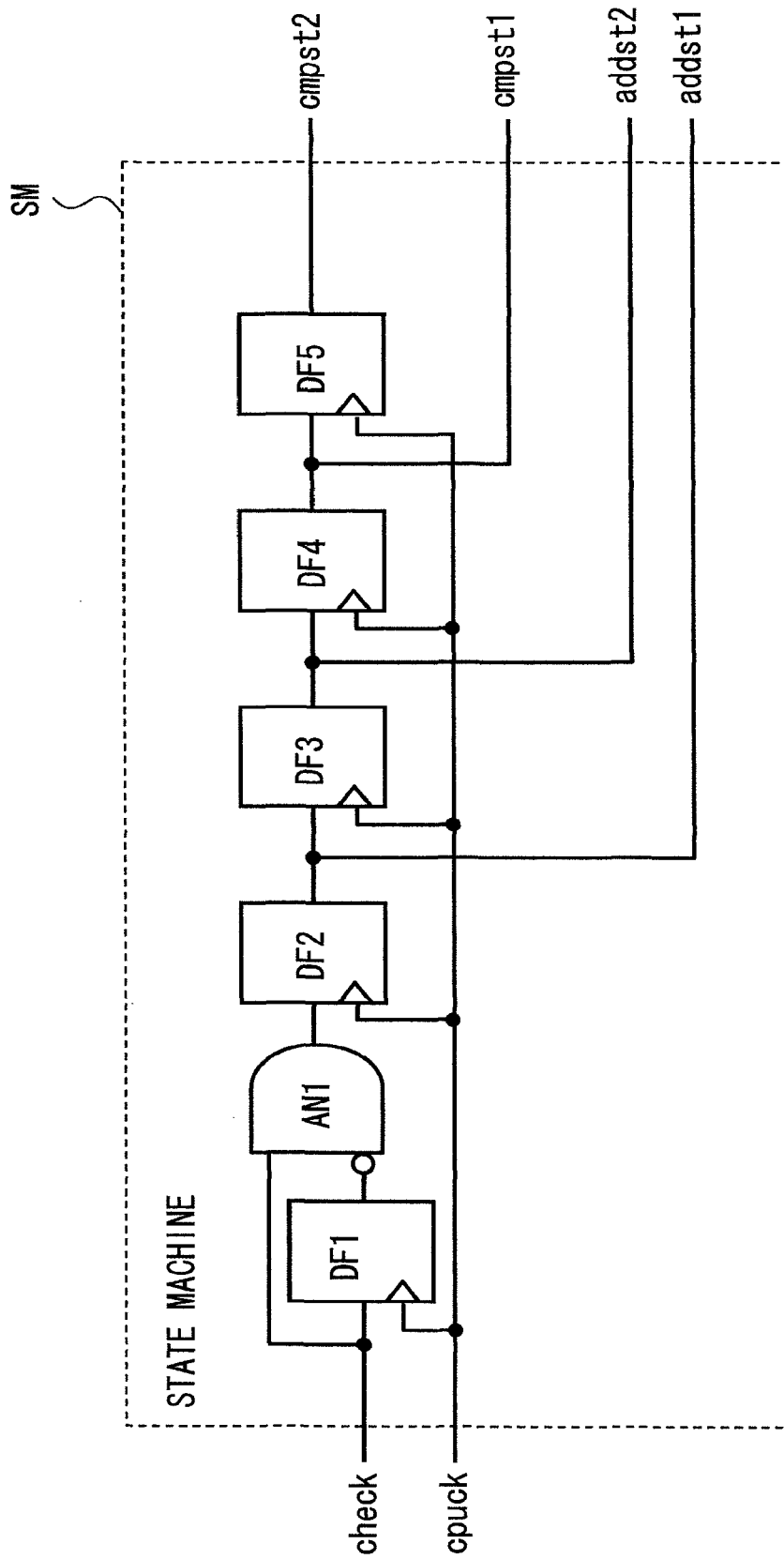
FIG. 7 is a circuit diagram of a state machine SM.

FIG. 7 shows a circuit diagram of the state machine SM. As shown in FIG. 7, the state machine SM includes five D-flip-flops DF1 to DF5 and an AND gate AN1. The clock signal cpuck is input to the clock inputs of all the D-flip-flops DF1 to DF5. The execution signal check is input to the data input of the D-flip-flop DF1.

The execution signal check is also input to one of the inputs of the AND gate AN1, and an inverted signal of the non-inverting output signal of the D-flip-flop DF1 (i.e., signal equivalent to the inverting output signal of the D-flip-flop DF1) is input to the other input of the AND gate AN1. Note that the execution signal check is a signal that is in synchronization with the clock signal cpuck and has a frequency equal to an integral multiple of the frequency of the clock signal cpuck. Further, the non-inverting output signal of the D-flip-flop DF1 is a signal that is obtained by delaying the execution signal check by an amount equal to one cycle of the clock signal cpuck. Therefore, as the output signal of the AND gate AN1, a signal that rises as the execution signal check rises and remains at the high level only for a period equal to one cycle of the clock signal cpuck is obtained.

The output signal of the AND gate AN1 is input to the data input of the D-flip-flop DF2. The non-inverting output signal of the D-flip-flop DF2 is a state signal addst1. The state signal addst1 is a signal that is obtained by delaying the output signal of the AND gate AN1 by an amount equal to one cycle of the clock signal cpuck.

The state signal addst1 is input to data input of the D-flip-flop DF3. The non-inverting output signal of the D-flip-flop DF3 is a state signal addst2. The state signal addst2 is a signal that is obtained by delaying the state signal addst1 by an amount equal to one cycle of the clock signal cpuck.

The state signal addst2 is input to data input of the D-flip-flop DF4. The non-inverting output signal of the D-flip-flop DF4 is a state signal cmpst1. The state signal cmpst1 is a signal that is obtained by delaying the state signal addst2 by an amount equal to one cycle of the clock signal cpuck.

The state signal cmpst1 is input to data input of the D-flip-flop DF5. The non-inverting output signal of the D-flip-flop DF5 is a state signal cmpst2. The state signal cmpst2 is a signal that is obtained by delaying the state signal cmpst1 by an amount equal to one cycle of the clock signal cpuck.

Referring to FIG. 6 again, the counter CNT0 counts the number of activations of the enable signal cen01[0] according to the clock signal cpuck and the state signal addst1. The counter CNT1 counts the number of activations of the enable signal cen01[1] according to the clock signal cpuck and the state signal addst1. Similarly, the other counters CNT2 to CNT19 count the numbers of activations of their respective input enable signals according to the clock signal cpuck and the state signal addst1.

Note that the counters CNT0 to CNT3 count the numbers of activations of the enable signals cen01[0] to cen01[3], each of which is input to respective one of the four blocks of the instruction cache memory IC0.

The counters CNT4 to CNT7 count the numbers of activations of the enable signals cen02[0] to cen02[3], each of which is input to respective one of the four blocks of the data cache memory DC0.

The counters CNT8 to CNT11 count the numbers of activations of the enable signals cen11[0] to cen11[3], each of which is input to respective one of the four blocks of the instruction cache memory IC1.

The counters CNT12 to CNT15 count the numbers of activations of the enable signals cen12[0] to cen12[3], each of which is input to respective one of the four blocks of the data cache memory DC1.

The counters CNT16 to CNT19 count the numbers of activations of the enable signals 12cen[0] to 12cen[3], each of which is input to respective one of the four blocks of the secondary cache memory L2C.

The counters CNT0 to CNT19 add weights that are defined for the respective enable signals to the numbers of activations, and outputs count values cnt0 to cnt19 respectively. The weight is a value for one access. The weight can be calculated based on a current value for memory access that is obtained from library data for each cache memory.

Figure 8:
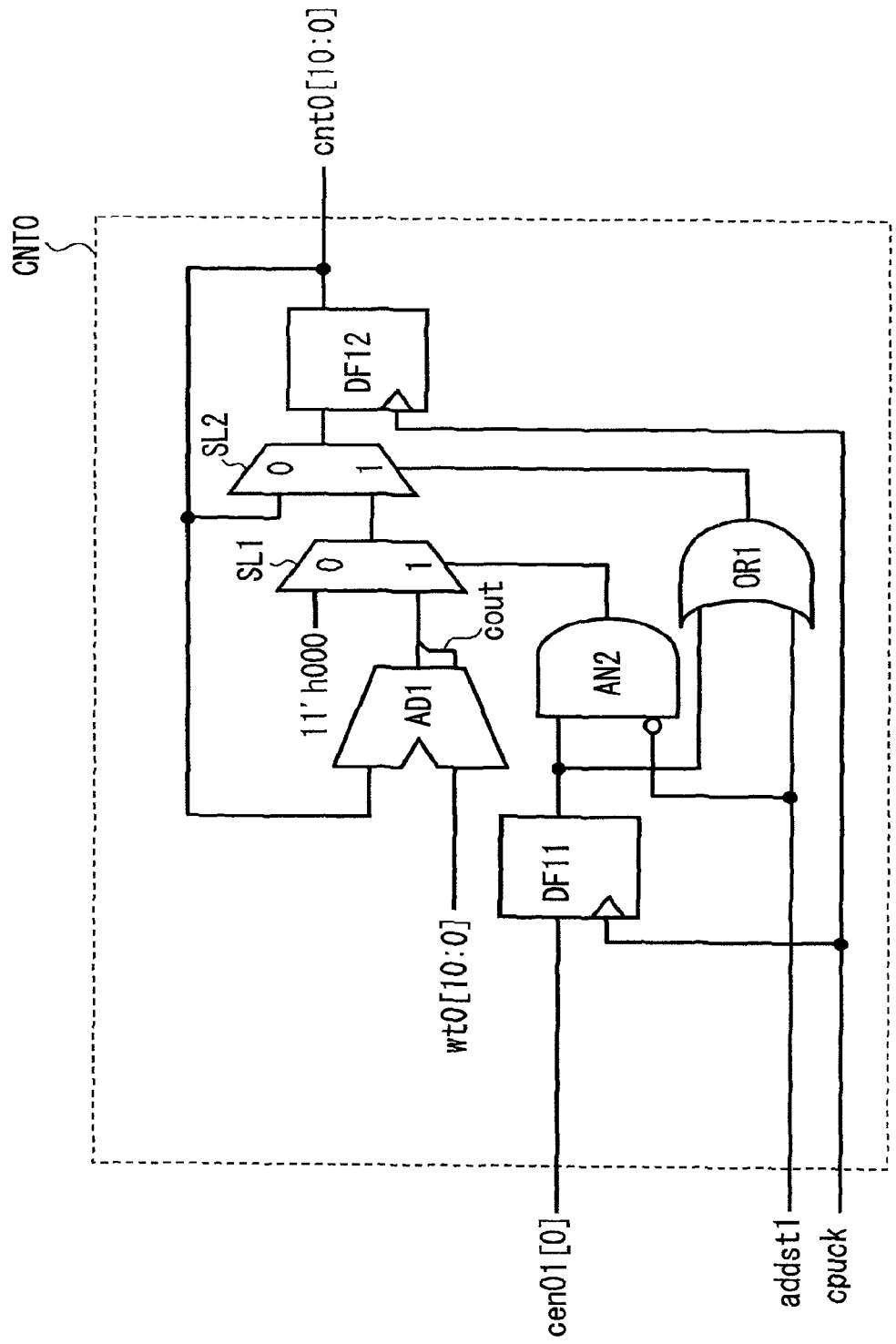
FIG. 8 is a circuit diagram of a counter CNT0.

FIG. 8 is a circuit diagram of the counter CNT0. As shown in FIG. 8, the counter CNT0 includes two D-flip-flops DF11 and DF12, an AND gate AN2, an OR gate OR1, an adder AD1, and two selectors SL1 and SL2.

The clock signal cpuck is input to the clock inputs of both D-flip-flops DF11 and DF12. The enable signal cen01[0] is input to the data input of the D-flip-flop DF11. The non-inverting output signal of the D-flip-flop DF11 is input to one of the inputs of the AND gate AN2. An inverted signal of the state signal addst1 is input to the other input of the AND gate AN2.

The output of the AND gate AN2 is a control signal for the selector SL1. That is, when the output value of the AND gate AN2 is a High-level ("1"), the 1-input of the selector SL1 is selected, whereas when the output value of the AND gate AN2 is a Low-level ("0"), the 0-input of the selector SL1 is selected. Note that an 11-bit reset value 11'h000 is input to the 0-input of the selector SL1. Meanwhile, the output of the adder AD1 is input to the 1-input of the selector SL1. An 11-bit weight signal wt0[10:0] is input to one of the inputs of the adder AD1. The count value cnt0[10:0] of the counter CNT0 is input to the other input of the adder AD1. That is, the adder AD1 outputs a value obtained by adding the weight signal wt0[10:0] to the count value cnt0[10:0].

The non-inverting output signal of the D-flip-flop DF11 is input to one of the inputs of the OR gate OR1. The state signal addst1 is input to the other input of the OR gate OR1. The output of the OR gate OR1 is a control signal for the selector SL2. That is, when the output value of the OR gate OR1 is a High-level ("1"), the 1-input of the selector SL2 is selected, whereas when the output value of the OR gate OR1 is a Low-level ("0"), the 0-input of the selector SL2 is selected. Note that the count value cnt0[10:0] of the 11-bit counter CNT0 is connected to the 0-input of the selector SL2. Meanwhile, the output value of the selector SL1 is connected to the 1-input of the selector SL2.

Next, an operation of the counter CNT0 is explained. The count value cnt0 is reset every time the state signal addst1 becomes a High-level after the rise of the execution signal check. Therefore, the period during which the state signal addst1 remains at a Low-level is the count period. When the signal addst1 is at a Low-level and the enable signal cen01[0] is also at a Low-level, the output value of the OR gate OR1 becomes a Low-level. Therefore, the count value cnt0[10:0] of the counter CNT0 connected to the 0-input of the selector SL2 is selected, and the current count value cnt0[10:0] is thereby retained.

When the signal addst1 is at a Low-level and the enable signal cen01[0] becomes a High-level, the output value of the AND gate AN2 becomes a High-level. Therefore, the output signal of the adder AD1 connected to the 1-input of the selector SL1 is selected. Further, the output value of the OR gate OR1 also becomes a High-level. Therefore, the output signal of the selector SL1 connected to the 1-input of the selector SL2 is selected. That is, a value obtained by adding the weight signal wt0[10:0] to the current count value cnt0[10:0], i.e., the output of the counter CNT0 is output as a new count value cnt0[10:0]. That is, the weight signal wt0[10:0] is added the number of times equal to the number of accesses performed in one count period.

When the state signal addst1 becomes a High-level, the output value of the AND gate AN2 becomes a Low-level and the output value of the OR gate OR1 becomes a High-level irrespective of the value of the enable signal cen01[0]. Therefore, the reset value 11'h000 connected to the 0-input of the selector SL1 is selected. Further, the output signal of the selector SL1 connected to the 1-input of the selector SL2 is selected. That is, the count value cnt0[10:0] is reset to the reset value 11'h000. Each of the other counters has a similar configuration to the counter CNT0, and operates in a similar manner to the counter CNT0.

Referring to FIG. 6 again, the adder circuit ADD adds up the count values cnt0[10:0] to cnt19[10:0] of the respective counters CNT0 to CNT19 according to the state signals addst1 and addst2, and outputs the addition result as a total value sum[15:0]. This total value sum[15:0] corresponds to the estimated current consumption.

Figure 9:
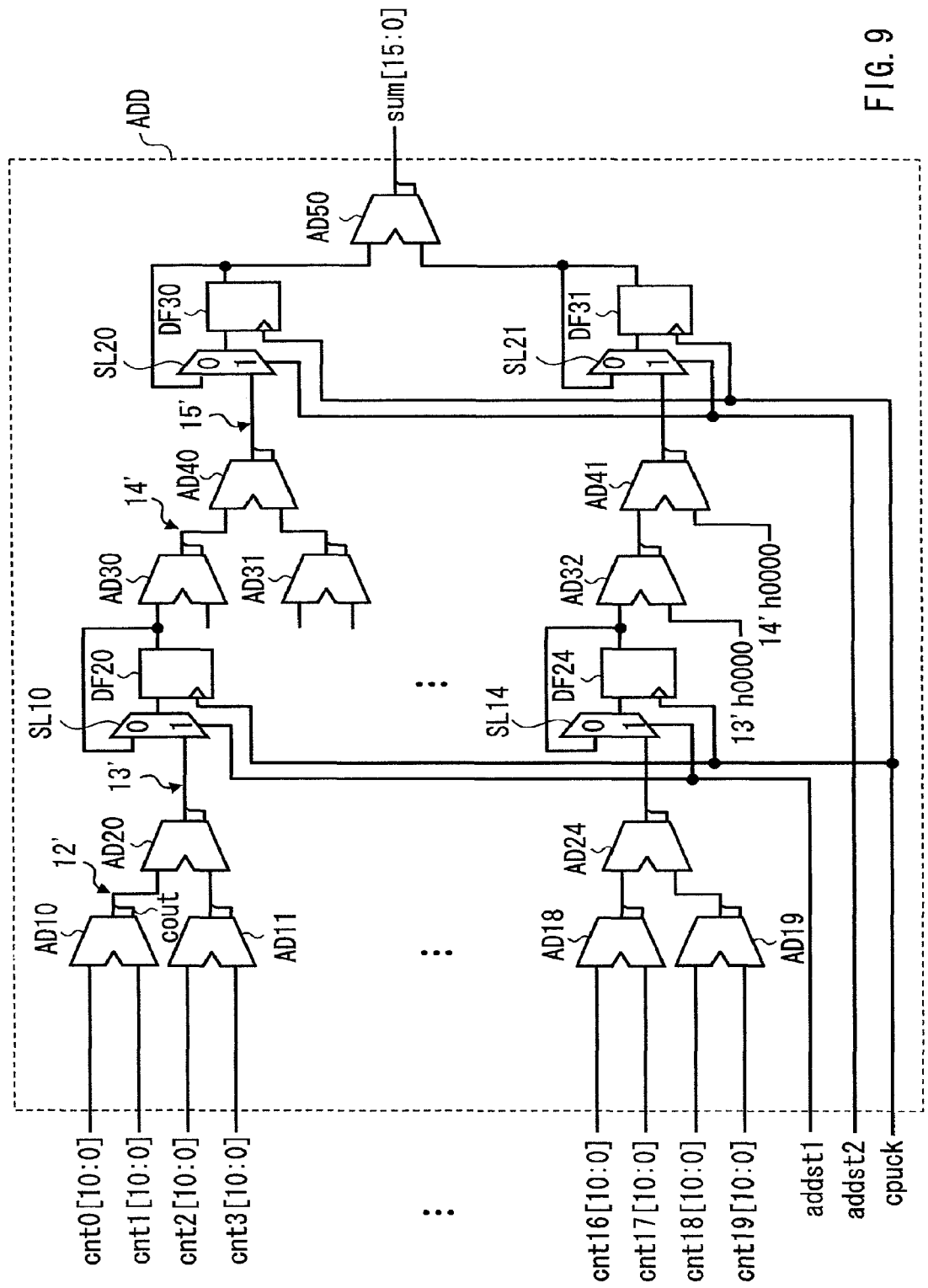
FIG. 9 is a circuit diagram of an adder circuit ADD.

Details of the adder circuit ADD are explained hereinafter with reference to FIG. 9. FIG. 9 is a circuit diagram of the adder circuit ADD. As shown in FIG. 9, the adder circuit ADD includes 21 adders AD10 to AD19, AD20 to AD24, AD30 to AD32, AD40, AD41 and AD50, seven D-flip-flops DF20 to DF24, DF30 and DF31, and seven selectors SL10 to SL14, SL20 and SL21. The clock signal cpuck is input to the clock inputs of all the D-flip-flops DF20 to DF24, DF30 and DF31.

The adder AD10 adds an 11-bit count value cnt0[10:0] from the counter CNT0 and an 11-bit count value cnt1[10:0] from the counter CNT1. Note that the adder AD10 outputs a 12-bit value including a carry output count.

The adder AD11 adds an 11-bit count value cnt2[10:0] from the counter CNT2 and an 11-bit count value cnt3[10:0] from the counter CNT3. Note that the adder AD11 outputs a 12-bit value including a carry output count.

The adder AD12 adds an 11-bit count value cnt4[10:0] from the counter CNT4 and an 11-bit count value cnt5[10:0] from the counter CNT5. Note that the adder AD12 outputs a 12-bit value including a carry output count.

The adder AD13 adds an 11-bit count value cnt6[10:0] from the counter CNT6 and an 11-bit count value cnt7[10:0] from the counter CNT7. Note that the adder AD13 outputs a 12-bit value including a carry output count.

The adder AD14 adds an 11-bit count value cnt8[10:0] from the counter CNT8 and an 11-bit count value cnt9[10:0] from the counter CNT9. Note that the adder AD14 outputs a 12-bit value including a carry output count.

The adder AD15 adds an 11-bit count value cnt10[10:0] from the counter CNT10 and an 11-bit count value cnt11[10:0] from the counter CNT11. Note that the adder AD15 outputs a 12-bit value including a carry output count.

The adder AD16 adds an 11-bit count value cnt12[10:0] from the counter CNT12 and an 11-bit count value cnt13[10:0] from the counter CNT13. Note that the adder AD16 outputs a 12-bit value including a carry output count.

The adder AD17 adds an 11-bit count value cnt14[10:0] from the counter CNT14 and an 11-bit count value cnt15[10:0] from the counter CNT15. Note that the adder AD17 outputs a 12-bit value including a carry output count.

The adder AD18 adds an 11-bit count value cnt16[10:0] from the counter CNT16 and an 11-bit count value cnt17[10:0] from the counter CNT17. Note that the adder AD18 outputs a 12-bit value including a carry output count.

The adder AD19 adds an 11-bit count value cnt18[10:0] from the counter CNT18 and an 11-bit count value cnt19[10:0] from the counter CNT19. Note that the adder AD19 outputs a 12-bit value including a carry output count.

The adder AD20 adds the 12-bit output value from the adder AD10 and the 12-bit output value from the adder AD11. Note that the adder AD20 outputs a 13-bit value including a carry output count.

The adder AD21 adds the 12-bit output value from the adder AD12 and the 12-bit output value from the adder AD13. Note that the adder AD21 outputs a 13-bit value including a carry output count.

The adder AD22 adds the 12-bit output value from the adder AD14 and the 12-bit output value from the adder AD15. Note that the adder AD22 outputs a 13-bit value including a carry output count.

The adder AD23 adds the 12-bit output value from the adder AD16 and the 12-bit output value from the adder AD17. Note that the adder AD23 outputs a 13-bit value including a carry output count.

The adder AD24 adds the 12-bit output value from the adder AD18 and the 12-bit output value from the adder AD19. Note that the adder AD24 outputs a 13-bit value including a carry output count.

The state signal addst1 is a control signal for the selectors SL10 to SL14. That is, when the state signal addst1 is a High-level ("1"), the 1-inputs of the selectors SL10 to SL14 are selected, whereas when the state signal addst1 is a Low-level ("0"), the 0-inputs of the selectors SL10 to SL14 are selected. Note that the 13-bit output value from the adder AD20 is input to the 1-input of the selector SL10. Meanwhile, the non-inverting output signal from the D-flip-flop DF20, whose data input is connected to the output of the selector SL10, is fed back to the 0-input of the selector SL10.

Similarly, the 13-bit output value from the adder AD21 is input to the 1-input of the selector SL11. Meanwhile, the non-inverting output signal from the D-flip-flop DF21, whose data input is connected to the output of the selector SL11, is fed back to the 0-input of the selector SL11.

The 13-bit output value from the adder AD22 is input to the 1-input of the selector SL12. Meanwhile, the non-inverting output signal from the D-flip-flop DF22, whose data input is connected to the output of the selector SL12, is fed back to the 0-input of the selector SL12.

The 13-bit output value from the adder AD23 is input to the 1-input of the selector SL13. Meanwhile, the non-inverting output signal from the D-flip-flop DF23, whose data input is connected to the output of the selector SL13, is fed back to the 0-input of the selector SL13.

The 13-bit output value from the adder AD24 is input to the 1-input of the selector SL14. Meanwhile, the non-inverting output signal from the D-flip-flop DF24, whose data input is connected to the output of the selector SL14, is fed back to the 0-input of the selector SL14.

The adder AD30 adds the 13-bit non-inverting output signal from the D-flip-flop DF20 and the 13-bit non-inverting output signal from the D-flip-flop DF21 Note that the adder AD30 outputs a 14-bit value including a carry output count.

The adder AD31 adds the 13-bit non-inverting output signal from the D-flip-flop DF22 and the 13-bit non-inverting output signal from the D-flip-flop DF23. Note that the adder AD31 outputs a 14-bit value including a carry output count.

The adder AD32 adds the 13-bit non-inverting output signal from the D-flip-flop DF24 and a 13-bit 0 value 13'h0000. Note that the adder AD32 outputs a 14-bit value including a carry output count.

The adder AD40 adds the 14-bit output value from the adder AD30 and the 14-bit output value from the adder AD31. Note that the adder AD40 outputs a 15-bit value including a carry output count.

The adder AD41 adds the 14-bit output value from the adder AD32 and a 14-bit 0 value 14'h0000. Note that the adder AD41 outputs a 15-bit value including a carry output count.

The state signal addst2 is a control signal for the selectors SL20 and SL21. That is, when the state signal addst2 is a High-level ("1"), the 1-inputs of the selectors SL20 and SL21 are selected, whereas when the state signal addst2 is a Low-level ("0"), the 0-inputs of the selectors SL20 and SL21 are selected.

Note that the 15-bit output value from the adder AD40 is input to the 1-input of the selector SL20. Meanwhile, the non-inverting output signal from the D-flip-flop DF30, whose data input is connected to the output of the selector SL20, is fed back to the 0-input of the selector SL20.

Similarly, the 15-bit output value from the adder AD41 is input to the 1-input of the selector SL21. Meanwhile, the non-inverting output signal from the D-flip-flop DF31, whose data input is connected to the output of the selector SL21, is fed back to the 0-input of the selector SL21.

Finally, the adder AD50 adds the 15-bit non-inverting output signal from the D-flip-flop DF30 and the 15-bit non-inverting output signal from the D-flip-flop DF31. Note that the adder AD50 outputs a 16-bit total value sum[15:0] including a carry output count. This total value sum[15:0] corresponds to the estimated current consumption.

Next, an operation of the adder circuit ADD is explained. The D-flip-flops DF20 to DF24 take in addition values obtained by the adders located in front of them every time the state signal addst1 becomes a High-level after the rise of the execution signal check. The D-flip-flops DF30 and DF31 take in addition values obtained by the adders located in front of them every time the state signal addst2 becomes a High-level after the rise of the state signal addst1. That is, the total value sum[15:0] is updated at these timings. On the other hand, when the state signals addst1 and addst2 are at a Low-level, the output values from the D-flip-flops DF20 to DF24, DF30 and DF31 do not change. Therefore, the total value sum[15:0] output from the adder AD50 is kept unchanged.

Referring to FIG. 6 again, the digital comparator CMP1 compares the total value sum[15:0] output from the adder circuit ADD with a maximum permissible value thmax[15:0] for the total value sum stored in the register REG1 according to the state signals cmpst1 and cmpst2. Then, if the total value sum[15:0] exceeds the maximum permissible value thmax[15:0], the digital comparator CMP1 outputs a request signal psreq1 for requesting a reduction of the frequency of the clock signal cpuck supplied to the multi-core processor 11, to the clock control circuit 14.

The digital comparator CMP2 compares the variation of the total value sum[15:0] output from the adder circuit ADD with a permissible variation thdel[15:0] for the total value sum stored in the register REG2 according to the state signals cmpst1 and cmpst2. Then, if the variation of the total value sum[15:0] exceeds the permissible variation thdel[15:0], the digital comparator CMP2 outputs a request signal psreq2 for requesting a reduction of the frequency of the clock signal cpuck supplied to the multi-core processor 11, to the clock control circuit 14.

Figure 10:
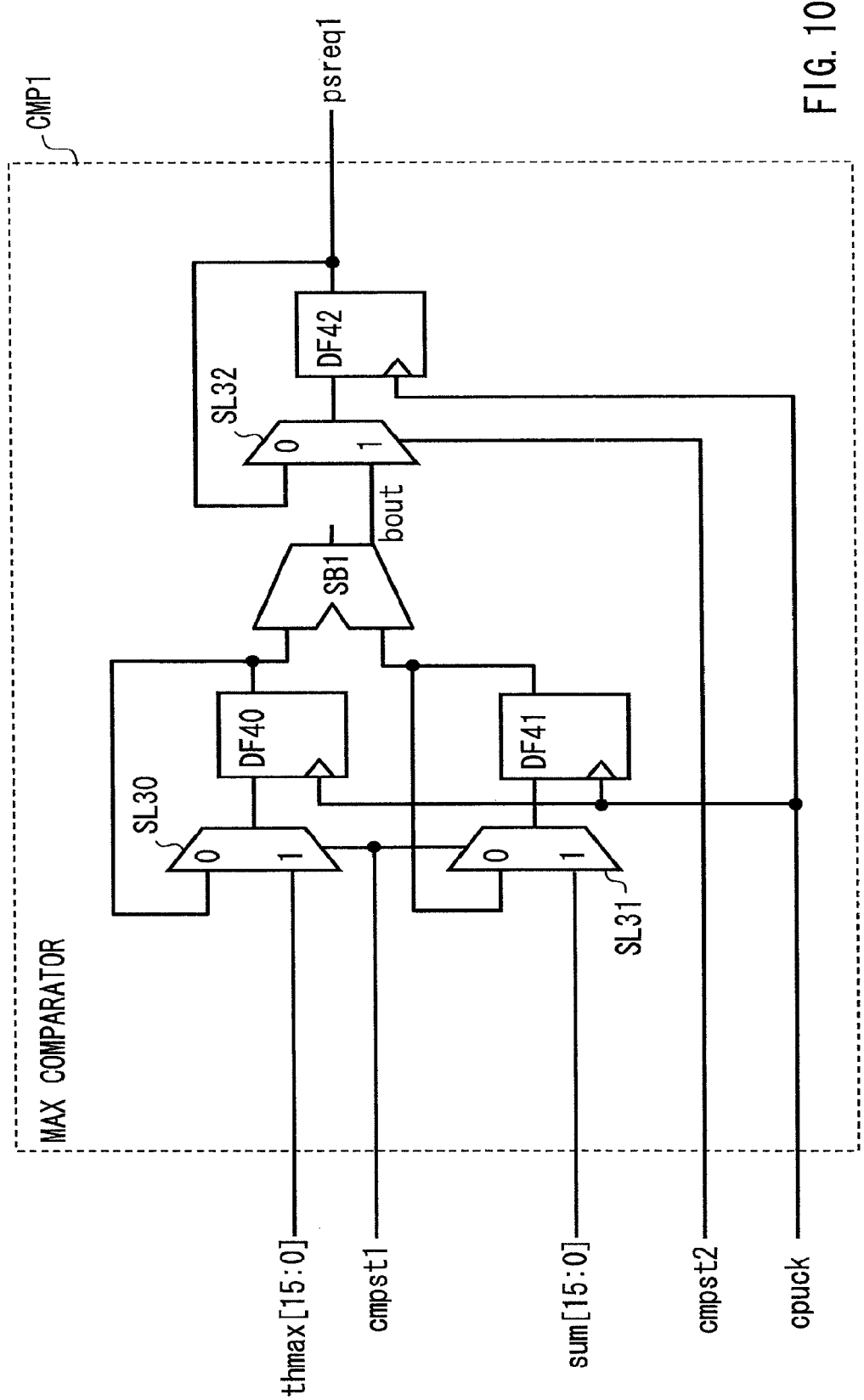
FIG. 10 is a circuit diagram of a digital comparator CMP1.
Figure 11:
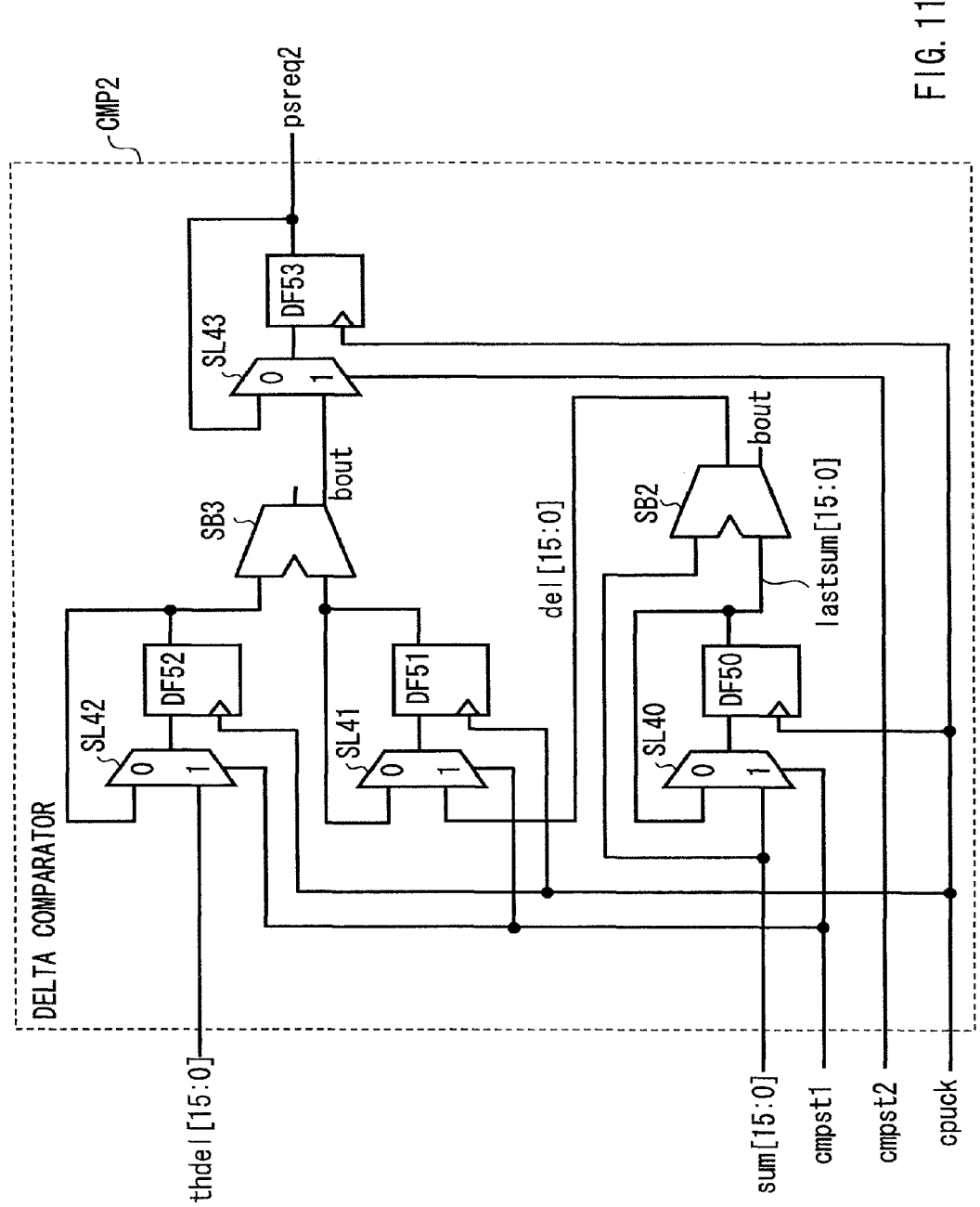
FIG. 11 is a circuit diagram of a digital comparator CMP2.

Details of the digital comparators CMP1 and CMP2 are explained hereinafter with reference to FIGS. 10 and 11. Firstly, the digital comparator CMP1 is explained with reference to FIG. 10. FIG. 10 is a circuit diagram of the digital comparator CMP1. As shown in FIG. 10, the digital comparator CMP1 includes a subtracter SB1, three D-flip-flops DF40 to DF42, and three selectors SL30 to SL32. The clock signal cpuck is input to the clock inputs of all the D-flip-flops DF40 to DF42.

The state signal cmpst1 is a control signal for the selectors SL30 and SL31. That is, when the state signal compst1 is a High-level ("1"), the 1-inputs of the selectors SL30 and SL31 are selected, whereas when the state signal cmpst1 is a Low-level ("0"), the 0-inputs of the selectors SL30 and SL31 are selected.

Note that the maximum permissible value thmax[15:0] is input to the 1-input of the selector SL30. Meanwhile, the non-inverting output signal from the D-flip-flop DF40, whose data input is connected to the output of the selector SL30, is fed back to the 0-input of the selector SL30.

Similarly, the total value sum[15:0] output from the adder circuit ADD is input to the 1-input of the selector SL31. Meanwhile, the non-inverting output signal from the D-flip-flop DF41, whose data input is connected to the output of the selector SL31, is fed back to the 0-input of the selector SL31.

The subtracter SB1 subtracts the non-inverting output signal of the D-flip-flop DF41 from the non-inverting output signal of the D-flip-flop DF40. That is, the subtracter SB1 subtracts the total value sum[15:0] from the maximum permissible value thmax[15:0]. Note that when the subtraction result is a negative value (i.e., when the total value sum[15:0] is greater than the maximum permissible value thmax[15:0]), a borrow output bout becomes a High-level. On the other hand, when the subtraction result is a positive value, the borrow output bout becomes a Low-level.

The state signal cmpst2 is a control signal for the selector SL32. That is, when the state signal compst2 is a High-level ("1"), the 1-input of the selector SL32 is selected, whereas when the state signal cmpst2 is a Low-level ("0"), the 0-input of the selector SL32 is selected.

Note that the borrow output bout of the subtracter SB1 is input to the 1-input of the selector SL32. Meanwhile, the non-inverting output signal from the D-flip-flop DF42, whose data input is connected to the output of the selector SL32, is fed back to the 0-input of the selector SL32. Further, the non-inverting output signal from the D-flip-flop DF42 is the request signal psreq1.

Next, an operation of the digital comparator CMP1 is explained. As described above, the total value sum[15:0] output from the adder circuit ADD is updated every time the state signal addst2 becomes a High-level after the rise of the execution signal check.

The D-flip-flops DF40 and DF41 take in the maximum permissible value thmax[15:0] and the updated total value sum[15:0] respectively every time the state signal cmpst1 becomes a High-level after the rise of the state signal addst2. At the same time, the subtracter SB1 subtracts the taken total value sum[15:0] from the taken maximum permissible value thmax[15:0].

The D-flip-flop DF42 takes in the value of the borrow output bout output from the subtracter SB1 every time the state signal cmpst2 becomes a High-level after the rise of the state signal cmpst1. Note that when the borrow output bout is at a High-level (i.e., when the total value sum[15:0] is greater than the maximum permissible value thmax[15:0]), the request signal psreq1 also becomes a High-level. On the other hand, when the borrow output bout is at a Low-level (i.e., when the total value sum[15:0] is not greater than the maximum permissible value thmax[15:0]), the request signal psreq1 also becomes a Low-level.

Note that when the state signals cmpst1 and cmpst2 are at a Low-level, the output values from the D-flip-flops DF40 to DF42 do not change. Therefore, the request signal psreq1 is kept unchanged.

Next, the digital comparator CMP2 is explained with reference to FIG. 11. FIG. 11 is a circuit diagram of the digital comparator CMP2. As shown in FIG. 11, the digital comparator CMP2 includes two subtracters SB2 and SB3, four D-flip-flops DF50 to DF53, and four selectors SL40 to SL43. The clock signal cpuck is input to the clock inputs of all the D-flip-flops DF50 to DF53.

The state signal cmpst1 is a control signal for the selectors SL40 and SL42. That is, when the state signal compst1 is a High-level ("1"), the 1-inputs of the selectors SL40 to SL42 are selected, whereas when the state signal cmpst1 is a Low-level ("0"), the 0-inputs of the selectors SL40 to SL42 are selected.

Note that the total value sum[15:0] output from the adder circuit ADD is input to the 1-input of the selector SL40. Meanwhile, the non-inverting output signal from the D-flip-flop DF50, whose data input is connected to the output of the selector SL40, is fed back to the 0-input of the selector SL40.

The subtracter SB2 subtracts the non-inverting output signal of the D-flip-flop DF50 from the total value sum[15:0] output from the adder circuit ADD and thereby outputs a variation del[15:0]. Note that the non-inverting output signal of the D-flip-flop DF50 is a total value lastsum[15:0] that was output from the adder circuit ADD at the last time. Therefore, the variation del[15:0] is the variation of the total value sum [15:0].

The variation del[15:0] is input to the 1-input of the selector SL41. Meanwhile, the non-inverting output signal from the D-flip-flop DF51, whose data input is connected to the output of the selector SL41, is fed back to the 0-input of the selector SL41.

A permissible variation thdel[15:0] is input to the 1-input of the selector SL42. Meanwhile, the non-inverting output signal from the D-flip-flop DF52, whose data input is connected to the output of the selector SL42, is fed back to the 0-input of the selector SL42.

The subtracter SB3 subtracts the non-inverting output signal of the D-flip-flop DF51 from the non-inverting output signal of the D-flip-flop DF52. That is, the subtracter SB3 subtracts the variation del[15:0] from the permissible variation thdel[15:0]. Note that when the subtraction result is a negative value (i.e., when the variation del[15:0] is greater than the permissible variation thdel[15:0]), a borrow output bout becomes a High-level. On the other hand, when the subtraction result is a positive value, the borrow output bout becomes a Low-level.

The state signal cmpst2 is a control signal for the selector SL43. That is, when the state signal compst2 is a High-level ("1"), the 1-input of the selector SL43 is selected, whereas when the state signal cmpst2 is a Low-level ("0"), the 0-input of the selector SL43 is selected.

Note that the borrow output bout of the subtracter SB3 is input to the 1-input of the selector SL43. Meanwhile, the non-inverting output signal from the D-flip-flop DF53, whose data input is connected to the output of the selector SL43, is fed back to the 0-input of the selector SL43. Further, the non-inverting output signal from the D-flip-flop DF53 is the request signal psreq2.

Next, an operation of the digital comparator CMP2 is explained. As described above, the total value sum[15:0] output from the adder circuit ADD is updated every time the state signal addst2 becomes a High-level after the rise of the execution signal check. Therefore, the variation del[15:0] is output from the subtracter SB2 at these timings.

The D-flip-flops DF52 and DF51 take in the permissible variation thdel[15:0] and the variation del[15:0] output from the subtracter SB2 respectively every time the state signal cmpst1 becomes a High-level after the rise of the state signal addst2. At the same time, the subtracter SB3 subtracts the taken variation del[15:0] from the taken permissible variation thdel[15:0]. Note that the variation del[15:0] output from the subtracter SB2 is reset at this timing.

The D-flip-flop DF53 takes in the value of the borrow output bout output from the subtracter SB3 every time the state signal cmpst2 becomes a High-level after the rise of the state signal cmpst1. Note that when the borrow output bout is at a High-level (i.e., when the variation del[15:0] is greater than the permissible variation thdel[15:0]), the request signal psreq2 also becomes a High-level. On the other hand, when the borrow output bout is at a Low-level (i.e., when the variation del[15:0] is not greater than the permissible variation thdel[15:0]), the request signal psreq2 also becomes a Low-level.

Note that when the state signals cmpst1 and cmpst2 are at a Low-level, the output values from the D-flip-flops DF50 to DF53 do not change. Therefore, the request signal psreq2 is kept unchanged.

Referring to FIG. 4 again, the internal configuration of the clock control circuit 14 is explained. As shown in FIG. 4, the clock control circuit 14 includes a register REG, decoders DEC1 and DEC2, a first clock adjustment unit 31, a second clock adjustment unit 32, and a timing generation circuit 33.

The register REG is a storage circuit in which the frequency-division ratio of the clock signal cpuck is stored in the form of a digital signal. The frequency-division ratio is set by the multi-core processor 11 through the internal bus IB. For example, the frequency-division ratio could be changed depending on the operating mode including a normal operating mode, a standby mode (low power consumption mode), and other modes.

The decoder DEC1 decodes a digital signal indicating the frequency-division ratio stored in the register REG.

The first clock adjustment unit 31 adjusts the digital signal value of the frequency-division ratio output from the decoder DEC1 according to the request signal psreq1 supplied from the memory access detection unit 12. Specifically, when the request signal psreq1, which is used to indicate that the estimated current consumption exceeds a predetermined reference value, becomes an active state, the first clock adjustment unit 31 changes the digital signal value of the frequency-division ratio output from the decoder DEC1 by one and thereby reduces the number of clocks to be output (i.e., clock frequency) by one level.

The second clock adjustment unit 32 adjusts the digital signal value of the frequency-division ratio output from the first clock adjustment unit 31 according to the request signal psreq2 supplied from the memory access detection unit 12. Specifically, when the request signal psreq2, which is used to indicate that the variation of the estimated current consumption exceeds a predetermined reference value, becomes an active state, the second clock adjustment unit 32 changes the digital signal value of the frequency-division ratio output from the first clock adjustment unit 31 so that the number of clocks to be output (i.e., clock frequency) becomes as small as possible within the available setting range.

The decoder DEC2 decodes the digital signal value of the frequency-division ratio output from the second clock adjustment unit 32 and outputs the decoded value to a frequency setting circuit DIV of the clock generation circuit 15 as a frequency-division control signal div.

Figure 12:
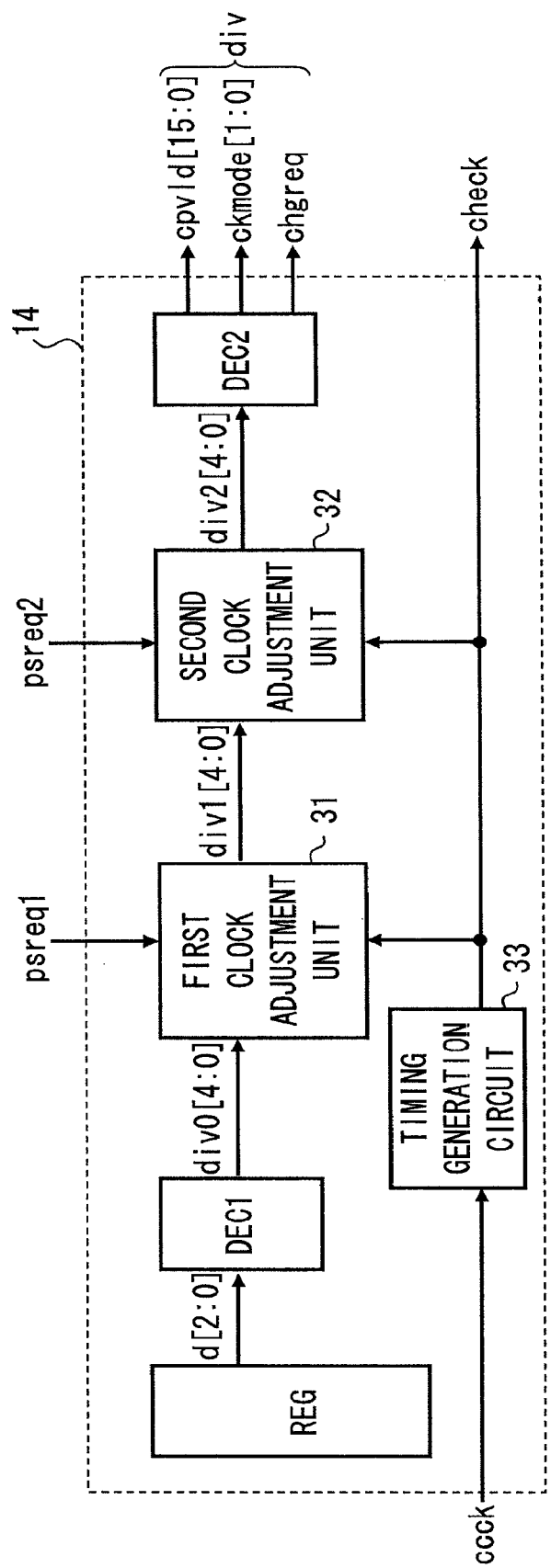
FIG. 12 is an enlarged view of a clock control circuit 14.

FIG. 12 is an enlarged view of the clock control circuit 14. A specific example of the clock control circuit 14 is explained in a more detailed manner with reference to FIG. 12.

The timing generation circuit 33 generates an execution signal check from a clock signal ccck. The execution signal check is a clock signal having a long cycle that can be obtained by multiplying the cycle of the clock signal ccck by an integer. A series of processes relating the clock frequency control according to the present invention is repeatedly performed in synchronization with rising and falling edges of the execution signal check. The cycle of the execution signal check needs to be determined so that feedback control of the clock cycle can be performed within the time constant of the bypass capacitor C1 that is used to smooth the current variation.

A 3-bit digital signal d[2:0] indicating the frequency-division ratio is stored in the register REG. FIG. 13A is a table showing a relation between the digital signal d[2:0] and a digital signal div0[4:0] (which is explained later). FIG. 13A also shows a relation between the digital signal d[2:0] and the frequency-division ratio. In this embodiment, values 1, 2, 4, 8 and 16 can be set as the frequency-division ratio, and they correspond to 3'h0, 3'h1, 3'h2, 3'h3 and 3'h4 respectively as the 3-bit digital value d[2:0].

The decoder DEC1 converts the 3-bit digital signal d[2:0] indicating the frequency-division ratio stored in the register REG into a 5-bit digital signal div0[4:0]. As shown in FIG. 13A, when the frequency-division ratio is 1, the number of clocks (hereinafter also called "clock number") becomes 16/16. Therefore, a value 5'h10 is assigned as the 5-bit digital signal. When the frequency-division ratio is 2, the clock number becomes 8/16. Therefore, a value 5'h08 is assigned as the 5-bit digital signal. When the frequency-division ratio is 4, the clock number becomes 4/16. Therefore, a value 5'h04 is assigned as the 5-bit digital signal. When the frequency-division ratio is 8, the clock number becomes 2/16. Therefore, a value 5'h02 is assigned as the 5-bit digital signal. Further, when the frequency-division ratio is 16, the clock number becomes 1/16. Therefore, a value 5'h01 is assigned as the 5-bit digital signal.

When the request signal psreq1 becomes an active state, the first clock adjustment unit 31 outputs a digital signal div1[4:0] that is obtained by decreasing the value of the digital signal div0[4:0] by one. FIG. 13B is a table showing values that the 5-bit digital signal div1[4:0] can take on. As shown in FIG. 13B, the digital signal div1[4:0] can take on digital values 5'h00 to 5'h10 corresponding to seventeen clock numbers 0/16 to 16/16.

Figure 14B:
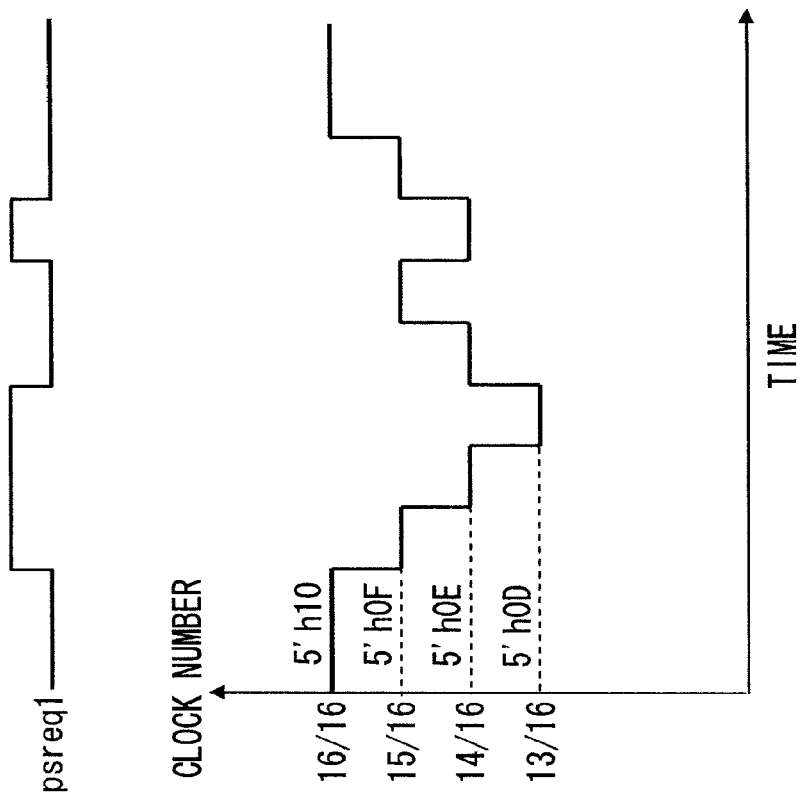
FIG. 14B is a graph showing clock frequency control performed by a second clock adjustment unit 32.
Figure 14A:
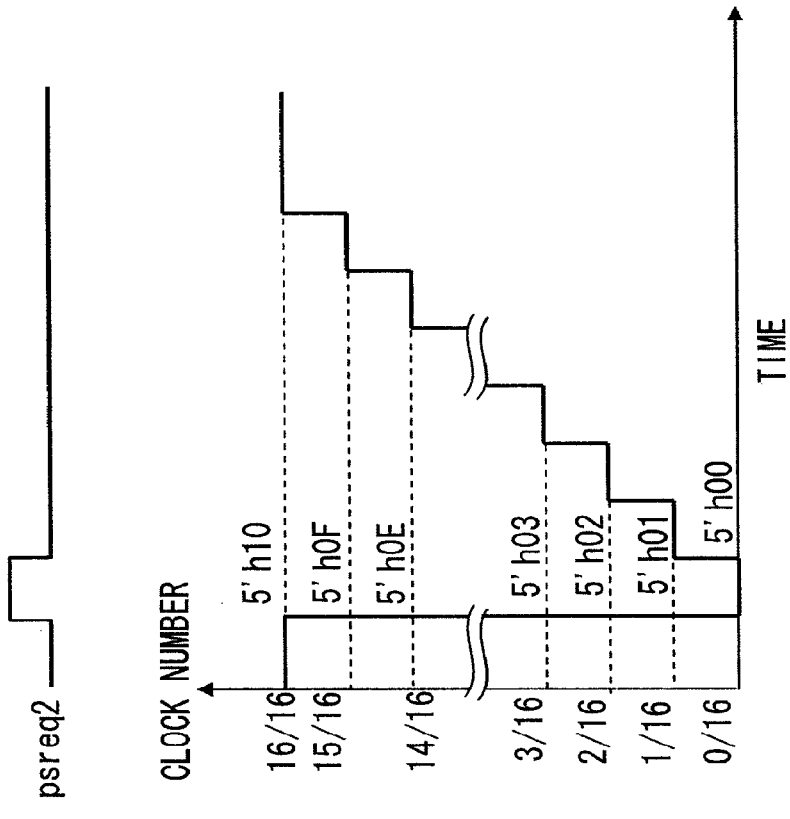
FIG. 14A is a graph showing clock frequency control performed by a first clock adjustment unit 31.

FIG. 14A is a graph showing clock frequency control performed by the first clock adjustment unit 31. FIG. 14A shows a case where the set frequency-division ratio is 1. Therefore, the value of the 5-bit digital signal div0[4:0] output from the decoder DEC1 in FIG. 12 is 5'h10. As shown in FIG. 14A, when the request signal psreq1 becomes an active state, the first clock adjustment unit 31 outputs 5'h0F, which is smaller than 5'h10 by one, as the digital signal div1[4:0]. When the active state of the request signal psreq1 continues, the first clock adjustment unit 31 continues outputting a digital signal div1[4:0] that is smaller than the previous signal by one. However, the lower limit of the digital signal div1[4:0] is 5'h00.

On the other hand, when the request signal psreq1 is in an inactive state, the first clock adjustment unit 31 outputs a digital signal div1[4:0] that is greater than the previous signal by one. However, the upper limit of the digital signal div1[4:0] is the digital signal div0[4:0] corresponding to the set frequency-division ratio. Therefore, as shown in FIG. 14A, when the request signal psreq1 becomes an inactive state in a state where the digital signal div1[4:0] is already the upper limit value (5'h10), the value of the digital signal div1[4:0] is kept at the upper limit value (5'h10).

When the request signal psreq2 becomes an active state, the second clock adjustment unit 32 outputs a digital signal div2[4:0] that is obtained by decreasing the value of the input digital signal div1[4:0] as much as possible within the available setting range. FIG. 13B also shows values that the 5-bit digital signal div2[4:0] can take on as well as those for the digital signal div1[4:0]. As shown in FIG. 13B, the digital signal div2[4:0] can take on digital values 5'h00 to 5'h10 corresponding to seventeen clock numbers 0/16 to 16/16.

FIG. 14B is a graph showing clock frequency control performed by the second clock adjustment unit 32. FIG. 14B shows a case where the set frequency-division ratio is 1. Therefore, the value of the 5-bit digital signal div0[4:0] output from the decoder DEC1 in FIG. 12 is 5'h10. When the request signal psreq2 becomes an active state, the second clock adjustment unit 32 outputs the minimum value 5'h00 that the digital signal div2[4:0] can take on as the 5-bit digital signal div2[4:0].

On the other hand, when the request signal psreq2 is in an inactive state, the second clock adjustment unit 32 outputs a digital signal div2[4:0] that is greater than the previous signal by one. However, the upper limit of the digital signal div2[4:0] is the digital signal div0[4:0] corresponding to the set frequency-division ratio. Therefore, as shown in FIG. 14B, when the request signal psreq2 becomes an inactive state in a state where the digital signal div2[4:0] is already the upper limit value (5'h10), the value of the digital signal div2[4:0] is kept at the upper limit value (5'h10).

As shown in FIG. 12, the decoder DEC2 generates a 16-bit pulse valid signal cpvld[15:0] and a mode signal ckmode[1:0] from the input 5-bit digital signal div2[4:0] and outputs the generated signals. Further, the decoder DEC2 outputs a request signal chgreq for requesting a change of the clock frequency according to the change of the value of the digital signal div2[4:0]. The request signal chgreq is a toggle signal whose output level is changed whenever the value of the digital signal div2[4:0] changes. Note that the above-described frequency-division control signal div is composed of the pulse valid signal cpvld[15:0], the mode signal ckmode [1:0], and the request signal chgreq.

FIG. 13C is a table showing a relation among the digital signal div2[4:0], the pulse valid signal cpvld[15:0], and the mode signal ckmode[1:0]. As shown in FIG. 13C, when digital signal div2[4:0]=5'h10, the clock number is 16/16. Therefore, a value 16'hFFFF in which every bit has a High-level ("1") is assigned as the value of the 16-bit pulse valid signal cpvld[15:0].

When digital signal div2[4:0]=5'h0F, the clock number is 15/16. That is, the clock is omitted at a rate of once in sixteen clocks. Therefore, a value 16'hFFFE in which only one bit has a Low-level ("0") is assigned as the value of the 16-bit pulse valid signal cpvld[15:0].

When digital signal div2[4:0]=5'h0E, the clock number is 14/16. That is, the clock is omitted at a rate of twice in sixteen clocks (once in eight clocks). Therefore, a value 16'hFEFE in which a Low-level ("0") is present at a rate of once in eight bits in a binary expression is assigned as the value of the 16-bit pulse valid signal cpvld[15:0].

In this manner, for the digital signal div2[4:0]=5'h0F for which the clock number is 15/16 to the digital signals div2[4: 0]=5'h09 for which the clock number is 9/16, a signal pattern in which the omitted clocks are uniformly arranged among the sixteen clocks is assigned as the value of the 16-bit pulse valid signal cpvld[15:0]. FIG. 13C shows a specific example of such signal patterns.

For the digital signal div2[4:0] for which the clock number is equal to or less than 8/16, they are arranged as follows. Firstly, for the digital signal div2[4:0]=5'h08 for which the clock number is 8/16, since the frequency-division ratio is 2, a value 16'hAAAA in which a Low-level ("0") and a High-level ("1") are alternately arranged is assigned. For the digital signal div2[4:0]=5'h04 for which the clock number is 4/16, since the frequency-division ratio is 4, a value 16'hCCCC in which two consecutive Low-levels ("0") and two consecutive High-levels ("1") are alternately arranged is assigned. For the digital signal div2[4:0]=5'h02 for which the clock number is 2/16, since the frequency-division ratio is 8, a value 16'hF0F0 in which four consecutive Low-levels ("0") and four consecutive High-levels ("1") are alternately arranged is assigned. For the digital signal div2[4:0]=5'h01 for which the clock number is 1/16, since the frequency-division ratio is 16, a value 16'hFFCC in which eight consecutive Low-levels ("0") and eight consecutive High-levels ("1") are alternately arranged is assigned.

The other digital signals div2[4:0] are also shown in FIG. 13C. Needless to say, the assignment of the signal pattern of the pulse valid signal cpvld[15:0] according to the clock number is not limited to the above-described assignment. The mode signal ckmode[1:0] is explained later.

Referring to FIG. 4 again, the internal configuration of the clock generation circuit 15 is explained. As shown in FIG. 4, the clock generation circuit 15 includes a phase synchronization circuit PLL and a frequency setting circuit DIV.

The phase synchronization circuit PLL outputs a clock signal pllout that is obtained by multiplying the frequency of an input clock signal ckin.

The frequency setting circuit DIV divides the frequency of the clock signal pllout output from the phase synchronization circuit PLL based on a frequency-division control signal div output from the clock control circuit 14, and thereby outputs a clock signal cpuck.

Figure 15:
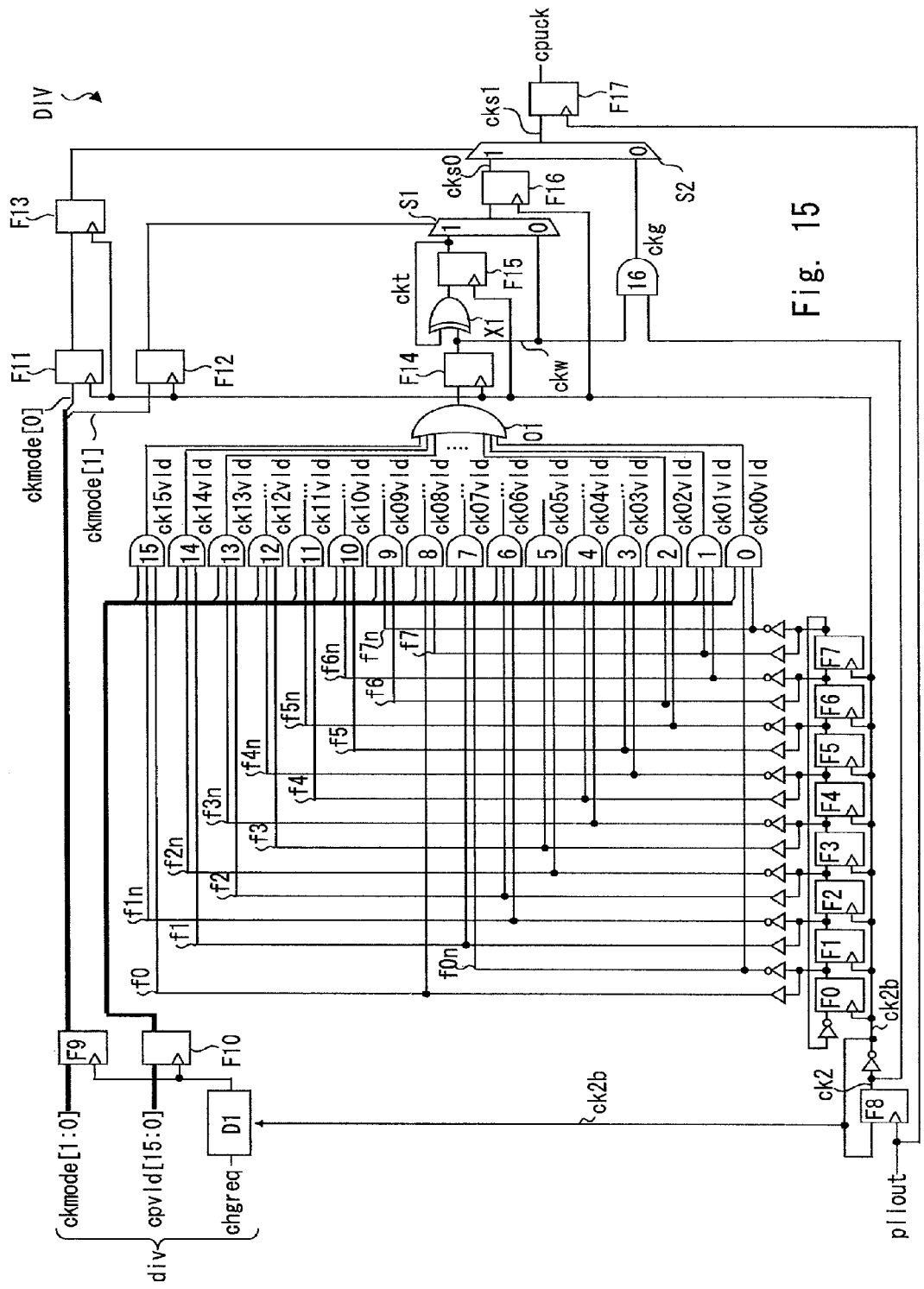
FIG. 15 is a circuit diagram of a frequency setting circuit DIV.

Details of the frequency setting circuit DIV are explained hereinafter with reference to FIG. 15. FIG. 15 is a circuit diagram of the frequency setting circuit DIV. As shown in FIG. 15, the frequency setting circuit DIV includes eighteen D-flip-flops F0 to F17, seventeen AND gates 0 to 16, an OR gate O1, an XOR gate X1, two selectors S1 and S2, and a delay circuit D1.

As described previously, the request signal chgreq is a toggle signal whose output level is changed whenever the value of the digital signal div2[4:0] changes. The delay circuit D1 generates a trigger signal by delaying changes of the output level of the request signal chgreq by a predetermined period according to a clock signal ck2b (which is explained later). The D-flip-flops F9 and F10 use this trigger signal to take in the mode signal ckmode[1:0] and the pulse valid signal cpvld[15:0] respectively.

Therefore, the output of the delay circuit D1 is connected to the clock inputs of the D-flip-flops F9 and F10. Further, the mode signal ckmode[1:0] is input to the data input of the D-flip-flop F9. The pulse valid signal cpvld[15:0] is input to the data input of the D-flip-flop F10.

The clock signal pllout output by the phase synchronization circuit PLL is input to the clock input of the D-flip-flop F8. Further, a clock signal ck2b that is obtained by inverting a clock signal ck2 output from the non-inverting output of the D-flip-flop F8 is fed back to the data input of the D-flip-flop F8.

This clock signal ck2b is also input to the clock inputs of the D-flip-flops F0 to F7 and F11 to F15. An inverted signal of the non-inverting output signal of the D-flip-flop F7 (i.e., inverting output signal of the D-flip-flop F7) is fed back to the data input of the D-flip-flop F0.

The non-inverting output signal f0 of the D-flip-flop F0 is input to the data input of the adjacent D-flip-flop F1 and is also input to the AND gates 8 and 15. Further, an inverted signal f0n of the non-inverting output signal f0 of the D-flipflop F0 (i.e., inverting output signal of the D-flip-flop F0) is input to the AND gates 0 and 7.

The non-inverting output signal f1 of the D-flip-flop F1 is input to the data input of the adjacent D-flip-flop F2 and is also input to the AND gates 7 and 14. Further, an inverted signal f1n of the non-inverting output signal f1 of the D-flip-flop F1 (i.e., inverting output signal of the D-flip-flop F1) is input to the AND gates 6 and 15.

The non-inverting output signal f2 of the D-flip-flop F2 is input to the data input of the adjacent D-flip-flop F3 and is also input to the AND gates 6 and 13. Further, an inverted signal f2n of the non-inverting output signal f2 of the D-flip-flop F2 (i.e., inverting output signal of the D-flip-flop F2) is input to the AND gates 5 and 14.

The non-inverting output signal f3 of the D-flip-flop F3 is input to the data input of the adjacent D-flip-flop F4 and is also input to the AND gates 5 and 12. Further, an inverted signal f3n of the non-inverting output signal f3 of the D-flip-flop F3 (i.e., inverting output signal of the D-flip-flop F3) is input to the AND gates 4 and 13.

The non-inverting output signal f4 of the D-flip-flop F4 is input to the data input of the adjacent D-flip-flop F5 and is also input to the AND gates 4 and 11. Further, an inverted signal f4n of the non-inverting output signal f4 of the D-flip-flop F4 (i.e., inverting output signal of the D-flip-flop F4) is input to the AND gates 3 and 12.

The non-inverting output signal f5 of the D-flip-flop F5 is input to the data input of the adjacent D-flip-flop F6 and is also input to the AND gates 3 and 10. Further, an inverted signal f5n of the non-inverting output signal f5 of the D-flip-flop F5 (i.e., inverting output signal of the D-flip-flop F5) is input to the AND gates 2 and 11.

The non-inverting output signal f6 of the D-flip-flop F6 is input to the data input of the adjacent D-flip-flop F7 and is also input to the AND gates 2 and 9. Further, an inverted signal f6n of the non-inverting output signal f6 of the D-flip-flop F6 (i.e., inverting output signal of the D-flip-flop F6) is input to the AND gates 1 and 10.

Further, the non-inverting output signal f7 of the D-flip-flop F7 is input to the AND gates 1 and 8. Further, an inverted signal f7n of the non-inverting output signal f7 of the D-flip-flop F7 (i.e., inverting output signal of the D-flip-flop F7) is fed back to the data input of the D-flip-flop F0 as described above and is also input to the AND gates 0 and 9.

As described above, the inverting output signal f0n of the D-flip-flop F0 and the inverting output signal f7n of the D-flip-flop F7 are input to the AND gate 0. Further, the pulse valid signal cpvld[0] is also input to the AND gate 0. Then, a valid signal ck00vld is output from the AND gate 0. As described later in detail, a pulse signal is formed from the inverting output signal f0n of the D-flip-flop F0 and the inverting output signal f7n of the D-flip-flop F7. The valid/invalid of the output of this pulse signal is determined by the pulse valid signal cpvld[0]. That is, when the pulse valid signal cpvld[0] is at a High-level, this pulse signal is output. On the other hand, when the pulse valid signal cpvld[0] is at a Low-level, this pulse signal is not output. This is also true for the pulse signals generated by the other AND gates.

The inverting output signal f6n of the D-flip-flop F6 and the non-inverting output signal f7 of the D-flip-flop F7 are input to the AND gate 1. Further, the pulse valid signal cpvld[1] is also input to the AND gate 1. Then, a valid signal ck01vld is output from the AND gate 1.

The inverting output signal f5n of the D-flip-flop F5 and the non-inverting output signal f6 of the D-flip-flop F6 are input to the AND gate 2. Further, the pulse valid signal cpvld[2] is also input to the AND gate 2. Then, a valid signal ck02vld is output from the AND gate 2.

The inverting output signal f4n of the D-flip-flop F4 and the non-inverting output signal f5 of the D-flip-flop F5 are input to the AND gate 3. Further, the pulse valid signal cpvld[3] is also input to the AND gate 3. Then, a valid signal ck03vld is output from the AND gate 3.

The inverting output signal f3n of the D-flip-flop F3 and the non-inverting output signal f4 of the D-flip-flop F4 are input to the AND gate 4. Further, the pulse valid signal cpvld[4] is also input to the AND gate 4. Then, a valid signal ck04vld is output from the AND gate 4.

The inverting output signal f2n of the D-flip-flop F2 and the non-inverting output signal f3 of the D-flip-flop F3 are input to the AND gate 5. Further, the pulse valid signal cpvld[5] is also input to the AND gate 5. Then, a valid signal ck05vld is output from the AND gate 5.

The inverting output signal f1n of the D-flip-flop F1 and the non-inverting output signal f2 of the D-flip-flop F2 are input to the AND gate 6. Further, the pulse valid signal cpvld[6] is also input to the AND gate 6. Then, a valid signal ck06vld is output from the AND gate 6.

The inverting output signal f0n of the D-flip-flop F0 and the non-inverting output signal f1 of the D-flip-flop F1 are input to the AND gate 7. Further, the pulse valid signal cpvld[7] is also input to the AND gate 7. Then, a valid signal ck07vld is output from the AND gate 7.

The non-inverting output signal f0 of the D-flip-flop F0 and the non-inverting output signal f7 of the D-flip-flop F7 are input to the AND gate 8. Further, the pulse valid signal cpvld[8] is also input to the AND gate 8. Then, a valid signal ck08vld is output from the AND gate 8.

The non-inverting output signal f6 of the D-flip-flop F6 and the inverting output signal f7n of the D-flip-flop F7 are input to the AND gate 9. Further, the pulse valid signal cpvld[9] is also input to the AND gate 9. Then, a valid signal ck09vld is output from the AND gate 9.

The non-inverting output signal f5 of the D-flip-flop F5 and the inverting output signal f6n of the D-flip-flop F6 are input to the AND gate 10. Further, the pulse valid signal cpvld[10] is also input to the AND gate 10. Then, a valid signal ck10vld is output from the AND gate 10.

The non-inverting output signal f4 of the D-flip-flop F4 and the inverting output signal f5n of the D-flip-flop F5 are input to the AND gate 11. Further, the pulse valid signal cpvld[11] is also input to the AND gate 11. Then, a valid signal ck11vld is output from the AND gate 11.

The non-inverting output signal f3 of the D-flip-flop F3 and the inverting output signal f4n of the D-flip-flop F4 are input to the AND gate 12. Further, the pulse valid signal cpvld[12] is also input to the AND gate 12. Then, a valid signal ck12vld is output from the AND gate 12.

The non-inverting output signal f2 of the D-flip-flop F2 and the inverting output signal f3n of the D-flip-flop F3 are input to the AND gate 13. Further, the pulse valid signal cpvld[13] is also input to the AND gate 13. Then, a valid signal ck13vld is output from the AND gate 13.

The non-inverting output signal f1 of the D-flip-flop F1 and the inverting output signal f2n of the D-flip-flop F2 are input to the AND gate 14. Further, the pulse valid signal cpvld[14] is also input to the AND gate 14. Then, a valid signal ck14vld is output from the AND gate 14.

The non-inverting output signal f0 of the D-flip-flop F0 and the inverting output signal f1n of the D-flip-flop F1 are input to the AND gate 15. Further, the pulse valid signal cpvld[15]

is also input to the AND gate 15. Then, a valid signal ck15vld is output from the AND gate 15.

The valid signals ck00vld to ck15vld output from the AND gates 0 to 15 are input to the OR gate O1. The output of the OR gate O1 is connected to the data input of the D-flip-flop F14, and is taken into the D-flip-flop F14 according to the clock signal ck2b. Then, it is output from the D-flip-flop F14 as a clock signal ckw for a waveform mode. This clock signal ckw is input to the 0-input of the selector S1, one of the inputs of the XOR gate X1, and one of the inputs of the AND gate 16. That is, clock signals for other modes are generated based on this clock signal ckw.

The clock signal ck2 is input to the other input of the AND gate 16. Therefore, a clock signal ckg for a clock gating mode is output from the AND gate 16. Meanwhile, the non-inverting output signal of the D-flip-flop F15, whose data input is connected to the output of the XOR gate X1, is fed back to the other input of the XOR gate X1. The non-inverting output signal of this D-flip-flop F15 is a clock signal ckt for a toggle mode. This clock signal ckt is input to the 1-input of the selector S1.

The selector S1 is controlled by a mode signal ckmode[1]. That is, when the mode signal ckmode[1] is a High-level ("1"), the clock signal ckt for the toggle mode, which is input to the 1-input of the selector S1, is selected, whereas when the mode signal ckmode[1] is a Low-level ("0"), the clock signal ckw for the waveform mode, which is input to the 0-input of the selector S1, is selected. The output of the selector S1 is input to the data input of the D-flip-flop F16. Further, a clock signal cks0 is output from the non-inverting output of the D-flip-flop F16. This clock signal cks0 is input to the 1-input of the selector S2. The clock signal ckg for the clock gating mode is input to the 0-input of the selector S2. Note that the mode signal ckmode[1] is input to the selector S1 through the D-flip-flop F12 as well as the above-described D-flip-flop F9.

The selector S2 is controlled by a mode signal ckmode[0]. That is, when the mode signal ckmode[0] is a High-level ("1"), the clock signal cks0, which is input to the 1-input of the selector S2 is selected, whereas when the mode signal ckmode[0] is a Low-level ("0"), the clock signal ckg for the clock gating mode, which is input to the 0-input of the selector S2, is selected. A clock signal cks1 output from the selector S2 is input to the data input of the D-flip-flop F17. Note that the clock signal pllout is input to the clock input of the D-flip-flop F17. Then, the output clock signal cpuck of the frequency setting circuit DIV is output from the non-inverting output of the D-flip-flop F17. Note that the mode signal ckmode[0] is input to the selector S2 through the D-flip-flops F11 and F13 as well as the above-described D-flip-flop F9.

Figure 16:
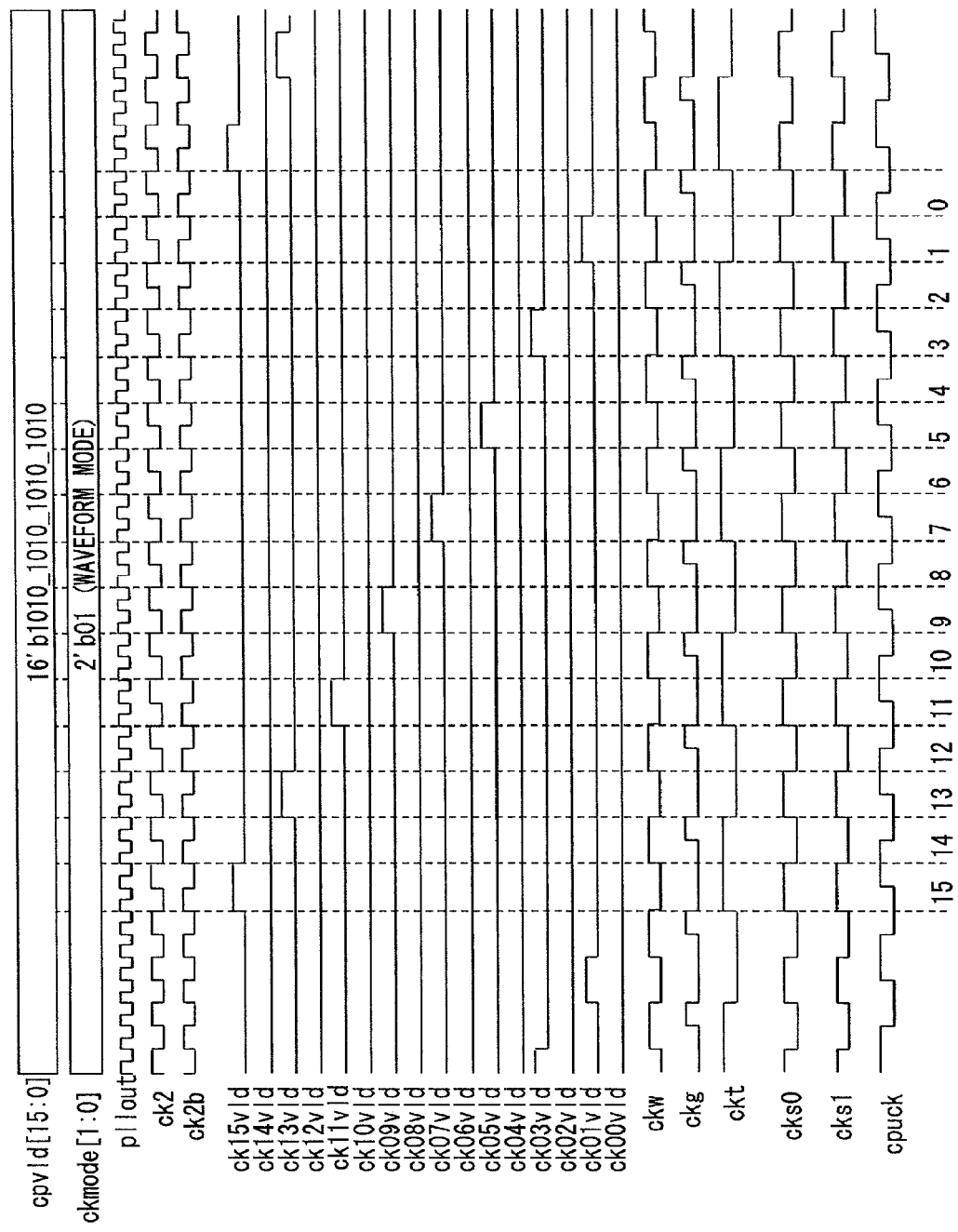
FIG. 16 is an example of a timing chart for explaining an operation of a frequency setting circuit DIV.

Next, an operation of the frequency setting circuit DIV is explained by using a timing chart shown in FIG. 16. FIG. 16 is an example of a timing chart for explaining an operation of the frequency setting circuit DIV.

The pulse valid signal cpcvld [15:0] is shown in the first row of the chart. In the example shown in FIG. 16, a case where cpvld[15:0]=16'hAAAA=16'b1010_1010_1010_ 1010 and the clock number is 8/16, which is one of the combinations listed in FIG. 13C, is shown.

The mode signal ckmode[1:0] is shown in the second row. As shown in FIG. 13C, in this embodiment, when the clock number is in a range of 0/16 to 8/16, the mode signal ckmode[1:0]=2'b01 and the clock signal ckw for the waveform mode is adopted.

The clock signal pullout is shown in the third row.

The clock signal ck2 is shown in the fourth row.

The clock signal ck2b is shown in the fifth row. The clock signal ck2 is in synchronization with the clock signal pullout and is obtained by dividing the frequency of the clock signal pullout by two. The clock signal ck2b is an inverted signal of the clock signal ck2. This clock signal ck2 is the clock signal having the maximum frequency that can be output from the frequency setting circuit DIV.

The valid signals ck00vld to ck15vld, which are output from the AND gates 0 to 15 respectively, are shown in the 6th to 21st rows. In this embodiment, since the pulse valid signal cpvld[15:0]=16'b1010_1010_1010_1010, the valid signals ck00vld, ck02vld, ck04vld, ck06vld, ck08vld, ck10vld, ck12vld and ck11vld are at a Low-level. On the other hand, the valid signals ck01vld, ck03vld, ck05vld, ck07vld, ck09vld, ck11vld, ck13vld and ck15vld are at a High-level.

The clock signal ckw for the waveform mode, which is output from the non-inverting output of the D-flip-flop F14, is shown in the 22nd row (sixth row from the bottom). This clock signal ckw is a signal obtained by delaying the output signal of the OR gate O1 by an amount equal to one cycle of the clock signal ck2b.

The clock signal ckg for the clock gating mode, which is output from the AND gate 16 to which the clock signal ckw and the clock signal ck2 are input, is shown in the fifth row from the bottom.

The clock signal ckt for the toggle mode, which is output from the non-inverting output of the D-flip-flop F15, is shown in the fourth row from the bottom. This clock signal ckt is a signal obtained by delaying the output signal of the XOR gate X1, to which the clock signal ckw and the clock signal ckt itself are input, by an amount equal to one cycle of the clock signal ck2b.

The clock signal cks0, which is output from the non-inverting output of the D-flip-flop F16, is shown in the third row from the bottom. Note that since ckmode[1]=0, the clock signal ckw is selected as the output of the selector S1. Further, the clock signal cks0 is a signal obtained by delaying the clock signal ckw by an amount equal to one cycle of the clock signal ck2b.

The clock signal cks1 output from the selector S2 is shown in the second row from the bottom. Note that since ckmode[0]=1, the clock signal cks0 is selected as the output of the selector S2. That is, the clock signal cks0 in the third row from the bottom is the same signal as the clock signal cks1 in the second row from the bottom.

The clock signal cpuck output from the frequency setting circuit DIV is shown in the last row. The clock signal cpuck is a signal obtained by delaying the clock signal cks1 by an amount equal to one cycle of the clock signal pllout.

Figure 17:
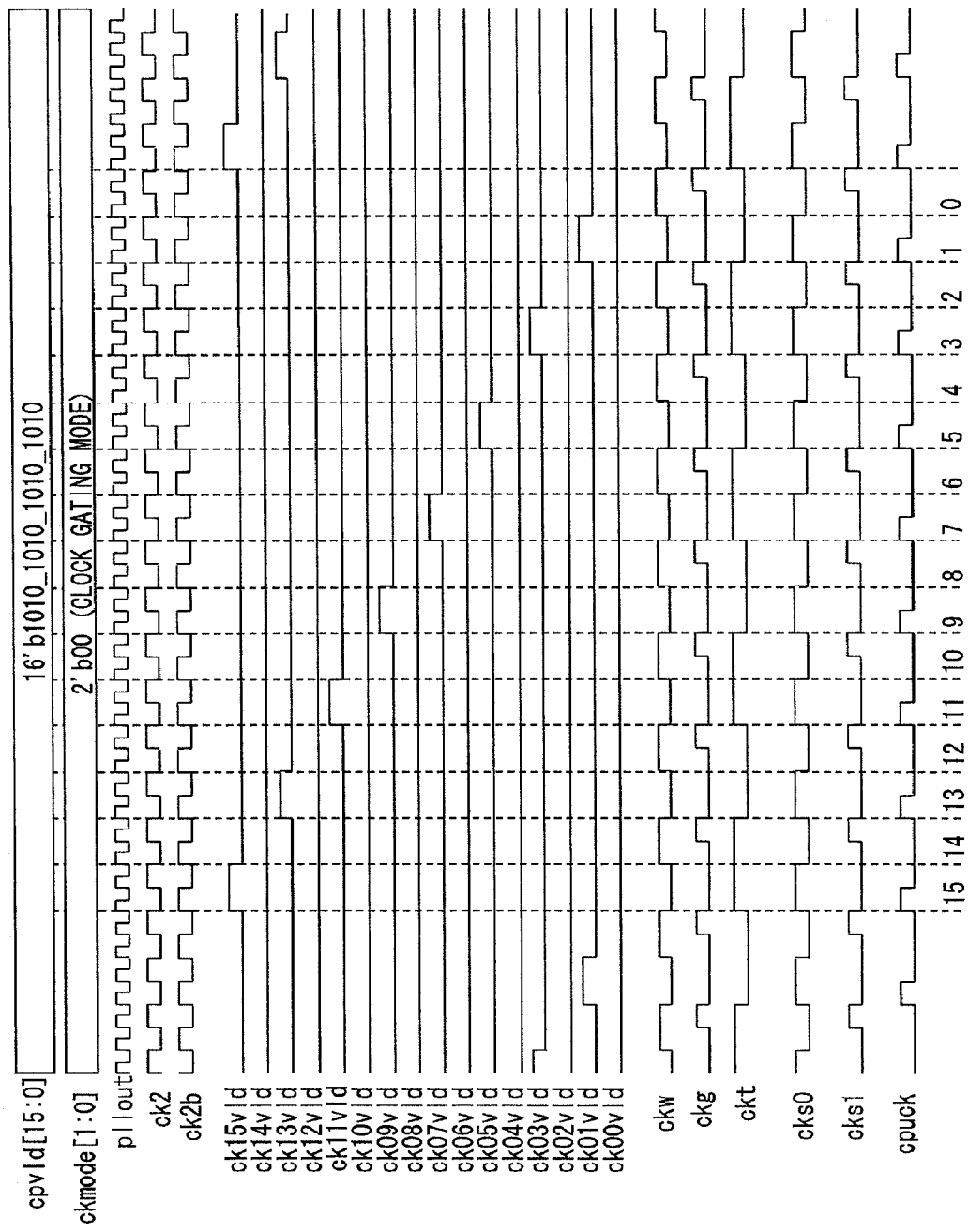
FIG. 17 is another example of a timing chart for explaining an operation of a frequency setting circuit DIV.

Next, the clock gating mode is explained by using a timing chart shown in FIG. 17. FIG. 17 is another example of a timing chart for explaining an operation of the frequency setting circuit DIV. The signals other than the mode signal ckmode[1:0] shown in the second row, the clock signal cks1 shown in the second row from the bottom, and the clock signal cpuck shown in the last row are the same as those shown in FIG. 16, and therefore their explanation is omitted.

In the case of the clock gating mode, the mode signal ckmode[1:0] shown in the second row has a value 2'b00.

The clock signal cks1 output from the selector S2 is shown in the second row from the bottom. Note that since ckmode[0]=0, the clock signal ckg for the clock gating mode, which is output from the AND gate 16 to which the clock signal ckw and the clock signal ck2 are input, is selected as the output of the selector S2. That is, this clock signal cks1 is the same signal as the clock signal ckg shown in the fifth row from the bottom.

The clock signal cpuck output from the frequency setting circuit DIV is shown in the last row. The clock signal cpuck is a signal obtained by delaying the clock signal cks1 by an amount equal to one cycle of the clock signal pllout.

Figure 18:
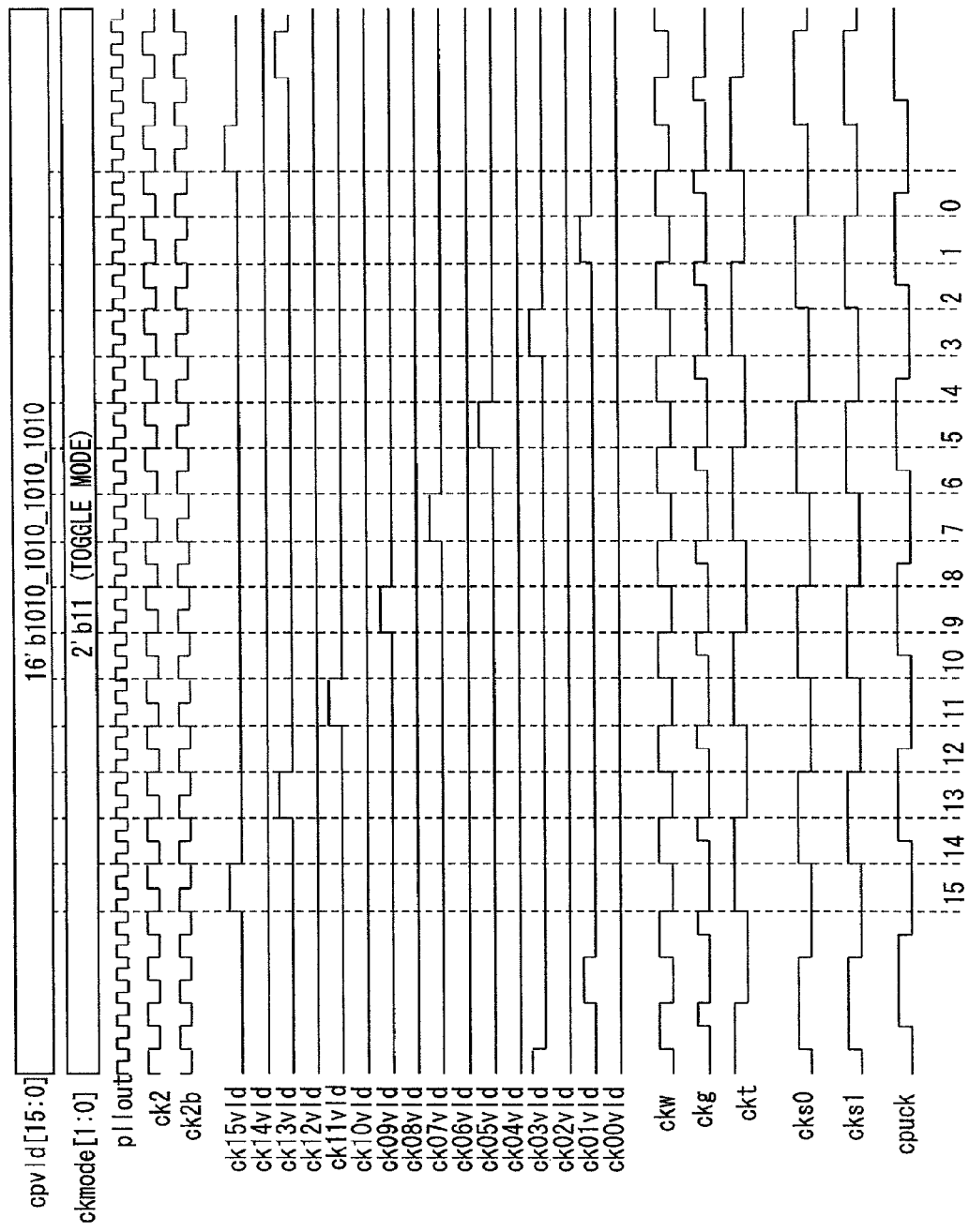
FIG. 18 is another example of a timing chart for explaining an operation of a frequency setting circuit DIV.

Next, the toggle mode is explained by using a timing chart shown in FIG. 18. FIG. 18 is another example of a timing chart for explaining an operation of the frequency setting circuit DIV. The signals other than the mode signal ckmode [1:0] shown in the second row, the clock signal cks0 shown in the third row from the bottom, the clock signal cks1 shown in the second row from the bottom, and the clock signal cpuck shown in the last row are the same as those shown in FIG. 16, and therefore their explanation is omitted.

In the case of the toggle mode, the mode signal ckmode[1:0] shown in the second row has a value 2'b11.

The clock signal cks0 output from the non-inverting output of the D-flip-flop F16 is shown in the third row from the bottom. Note that since ckmode[1]=1, the clock signal ckt in the fourth row from the bottom is selected as the output of the selector S1. Further, the clock signal cks0 is a signal obtained by delaying the clock signal ckt by an amount equal to one cycle of the clock signal ck2b.

The clock signal cks1 output from the selector S2 is shown in the second row from the bottom. Note that since ckmode [0]=1, the clock signal cks0 is selected as the output of the selector S2. That is, the clock signal cks0 in the third row from the bottom is the same signal as the clock signal cks1 in the second row from the bottom.

The clock signal cpuck output from the frequency setting circuit DIV is shown in the last row. The clock signal cpuck is a signal obtained by delaying the clock signal cks1 by an amount equal to one cycle of the clock signal pllout.

The mode signal ckmode[1:0] shown in FIG. 13C is just an example, and therefore the above-described three modes may be used for different purposes as appropriate as the need arises.

Figure 19:
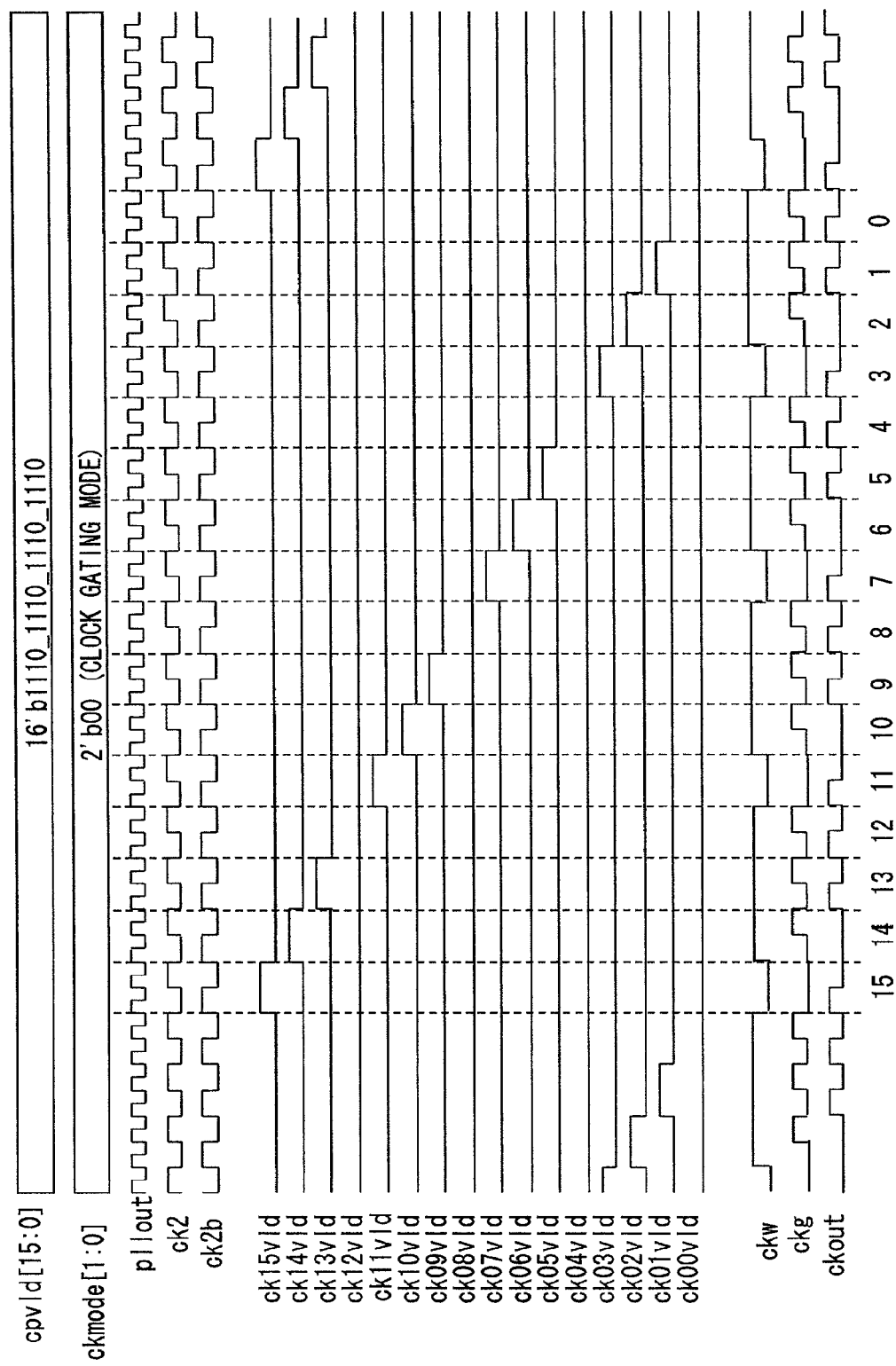
FIG. 19 is another example of a timing chart for explaining an operation of a frequency setting circuit DIV.

Next, an operation of the frequency setting circuit DIV is explained by using a timing chart shown in FIG. 19. FIG. 19 is another example of a timing chart for explaining an operation of the frequency setting circuit DIV. The pulse valid signal cpcvld[15:0] is shown in the first row of the chart. In the example shown in FIG. 19, a case where cpvld[15:0]= 16'hEEEE=16'b1110_1110_1110_1110 and the clock number is 12/16, which is one of the combinations listed in FIG. 13C, is shown.

The mode signal ckmode[1:0] is shown in the second row. As shown in FIG. 13C, in this embodiment, when the clock number is in a range of 9/16 to 16/16, the mode signal ckmode [1:0]=2'b00 and the clock signal ckg for the clock gating mode is adopted.

The clock signal pllout in the third row, the clock signal ck2 in the fourth row, and the clock signal ck2b in the fifth row are the same as those in FIG. 16, and therefore their explanation is omitted.

The valid signals ck00vld to ck15vld, which are output from the AND gates 0 to 15 respectively, are shown in the 6th to 21st rows. In this embodiment, since the pulse valid signal cpvld[15:0]=16'b1110_1110_1110_1110, the valid signals ck00vld, ck04vld, ck08vld and ck12vld are at a Low-level. On the other hand, the valid signals ck01vld, ck02vld, ck03vld, ck05vld, ck06vld, ck07vld, ck09vld, ck10vld, ck11vld, ck13vld, ck14vld and ck15vld are at a High-level.

The clock signal ckw for the waveform mode, which is output from the non-inverting output of the D-flip-flop F14, is shown in the third row from the bottom. This clock signal ckw is a signal obtained by delaying the output signal of the OR gate O1 by an amount equal to one cycle of the clock signal ck2b.

The clock signal ckg for the clock gating mode, which is output from the AND gate 16 to which the clock signal ckw and the clock signal ck2 are input, is shown in the second row from the bottom. Note that since ckmode[0]=0, the clock signal cks1 output from the selector S2 is the clock signal ckg.

The clock signal cpuck output from the frequency setting circuit DIV is shown in the last row. The clock signal cpuck is a signal obtained by delaying the clock signal cks1 by an amount equal to one cycle of the clock signal pllout.

The frequency-division ratio is often set to a value expressed as $2^n$ (n is an integer) such as 2, 4, 8 and 16. Therefore, when the frequency of the multi-core processor 11 needs to be temporally lowered in a state where the multi-core processor 11 is operating with the clock signal cpuck having the maximum frequency, the lowered frequency has to be selected from ½, ¼, ⅛, 1/16 or the like of the maximum frequency. In contrast to this, the frequency setting circuit DIV according to this embodiment allows the frequency to be adjusted at smaller steps.

Figure 20:
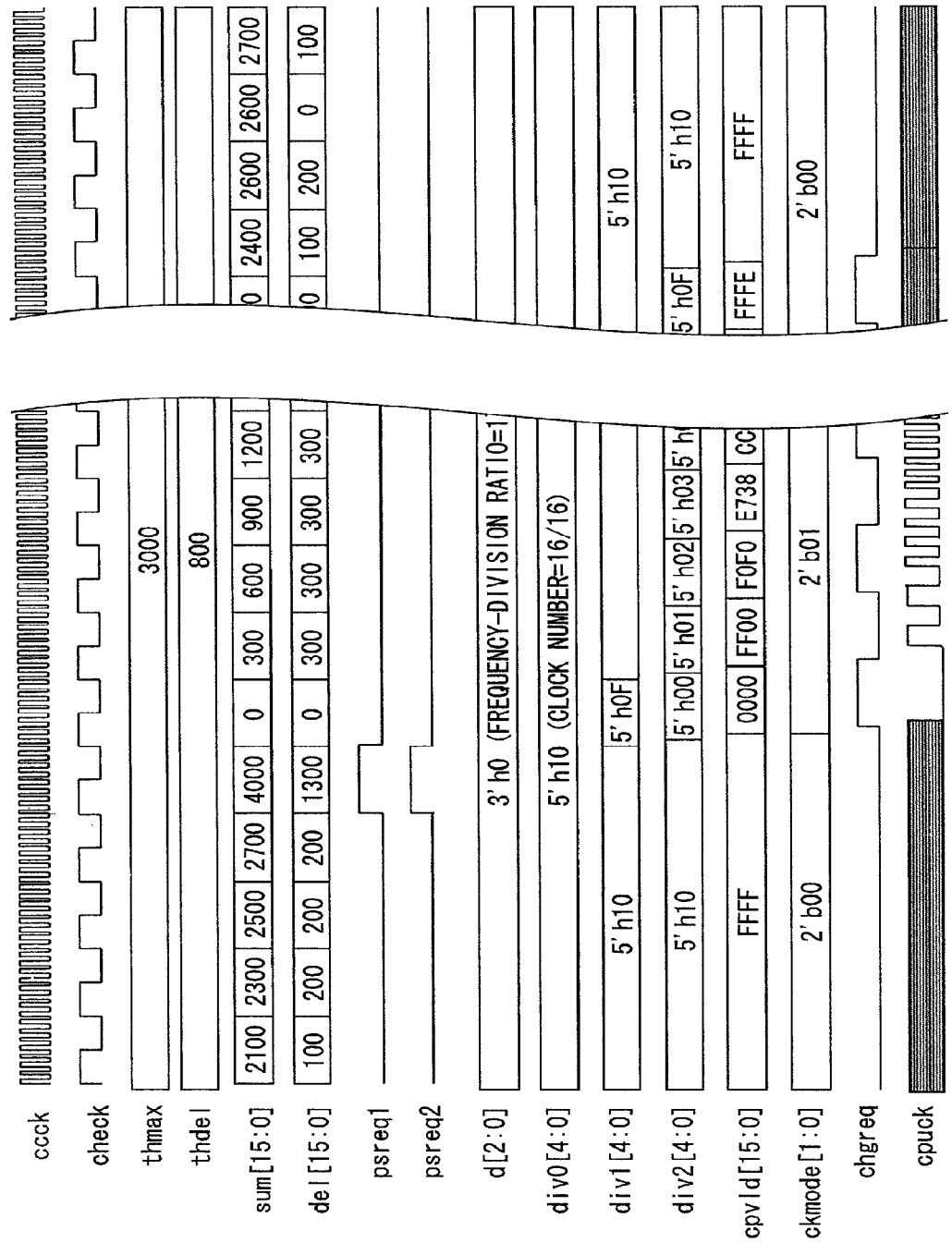
FIG. 20 is an example of a timing chart for explaining an overall clock frequency control operation.

Next, an overall clock frequency control operation is explained by using a timing chart shown in FIG. 20. FIG. 20 is an example of a timing chart for explaining an overall clock frequency control operation.

The clock signal ccck supplied to the clock control circuit 14 is shown in the first row of the chart.

The execution signal check is shown in the second row.

The maximum permissible value thmax[15:0] is shown in the third row. Note that thmax[15:0]=3000 in this example.

The permissible variation thdel[15:0] is shown in the fourth row. Note that thdel[15:0]=800 in this example.

The total value sum[15:0] is shown in the fifth row. Its value is updated in response to rising edges of the execution signal check.

The variation del[15:0] is shown in the sixth row. Its value is updated in response to rising edges of the execution signal check.

The request signal psreq1 is shown in the seventh row. In the period in which the total value sum[15:0] is equal to 4000 and thus the total value sum[15:0] exceeds the thmax [15:0]=3000, the request signal pereq1 is at a High-level. In the other periods, the request signal psreq1 is at a Low-level.

The request signal psreq2 is shown in the eighth row. In the period in which the variation del[15:0] is equal to 1300 and thus the variation del[15:0] exceeds the thdel[15:0]=800, the request signal pereq2 is at a High-level. In the other periods, the request signal psreq2 is at a Low-level. Note that the period during which the request signal psreq2 is at a High-level coincides with the period during which the request signal psreq1 is at a High-level.

The 3-bit digital signal d[2:0] indicating the frequency-division ratio is shown in the ninth row. In this example, the digital signal d[2:0]=3'h0, and the frequency-division ratio=1.

The 5-bit digital signal div0[4:0] indicating the frequency-division ratio is shown in the tenth row. In this example, the digital signal div0[4:0]=5'h10, and the output clock number (frequency)=16/16.

The 5-bit digital signal div1[4:0] output from the first clock adjustment unit 31 is shown in the eleventh row. The first clock adjustment unit 31 checks the output level of the request signal psreq1 at falling edges of the execution signal check and updates the value of the digital signal div1[4:0]. Note that in response to the change in the request signal psreq1 where the request signal psreq1 becomes a High-level only for one period, the value of the digital signal div1[4:0] is changed from 5'h10 to 5'h0F. Then, the digital signal div0[4:0] is restored to 5'h10 again in the next period.

The 5-bit digital signal div2[4:0] output from the second clock adjustment unit 32 is shown in the twelfth row. The second clock adjustment unit 32 checks the output level of the request signal psreq2 at falling edges of the execution signal check and updates the value of the digital signal div2[4:0]. Note that in response to the change in the request signal psreq2 where the request signal psreq2 becomes a High-level only for one period, the value of the digital signal div2[4:0] is changed from 5'h10 to 5'h00. Then, the value of the digital signal div2[4:0] is increased by one at a time in and after the next period, and is eventually restored to 5'h10.

The 16-bit clock valid signal ckvld[15:0] is shown in the thirteenth row (fourth row from the bottom).

The mode signal ckmode[1:0] is shown in the third row from the bottom. As shown in the table for the digital signal div2[4:0] shown in FIG. 13C, the values of the clock valid signal ckvld[15:0] and the mode signal ckmode[1:0] also change according to the change of the digital signal div2[4:0].

The request signal chgreq is shown in the second row from the bottom. The request signal chgreq is a toggle signal whose output level is changed whenever the value of the digital signal div2[4:0] changes.

The clock signal cpuck output from the frequency setting circuit DIV is shown in the last row. The clock signal cpuck according to the values of the clock valid signal ckvld[15:0] and the mode signal ckmode[1:0] is output.

When the request signals psreq1 and psreq2 becomes a High-level at the same time as in the example shown in FIG. 20, a higher priority is given to the request signal psreq2.

<Second Embodiment>

Next, a semiconductor device according to a second embodiment is explained with reference to FIGS. 21 to 23.

Figure 21:
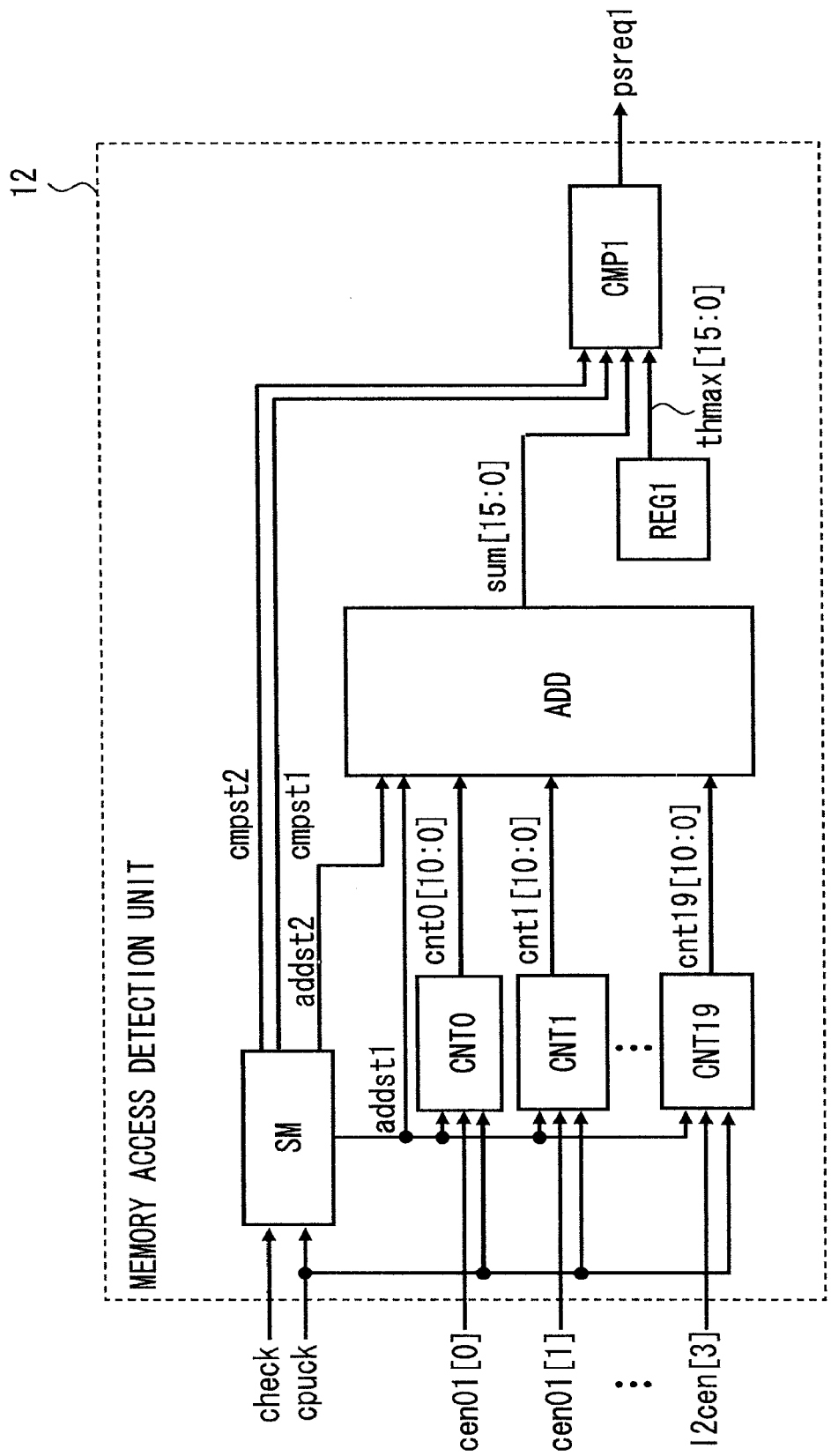
FIG. 21 is a circuit diagram of a memory access detection unit 12 according to a second embodiment.

FIG. 21 is a circuit diagram of a memory access detection unit 12 according to a second embodiment. In comparison to the memory access detection unit 12 according to the first embodiment shown in FIG. 6, the memory access detection unit 12 according to this embodiment shown in FIG. 21 does not include the digital comparator CMP2 and the register REG2.

Figure 22:
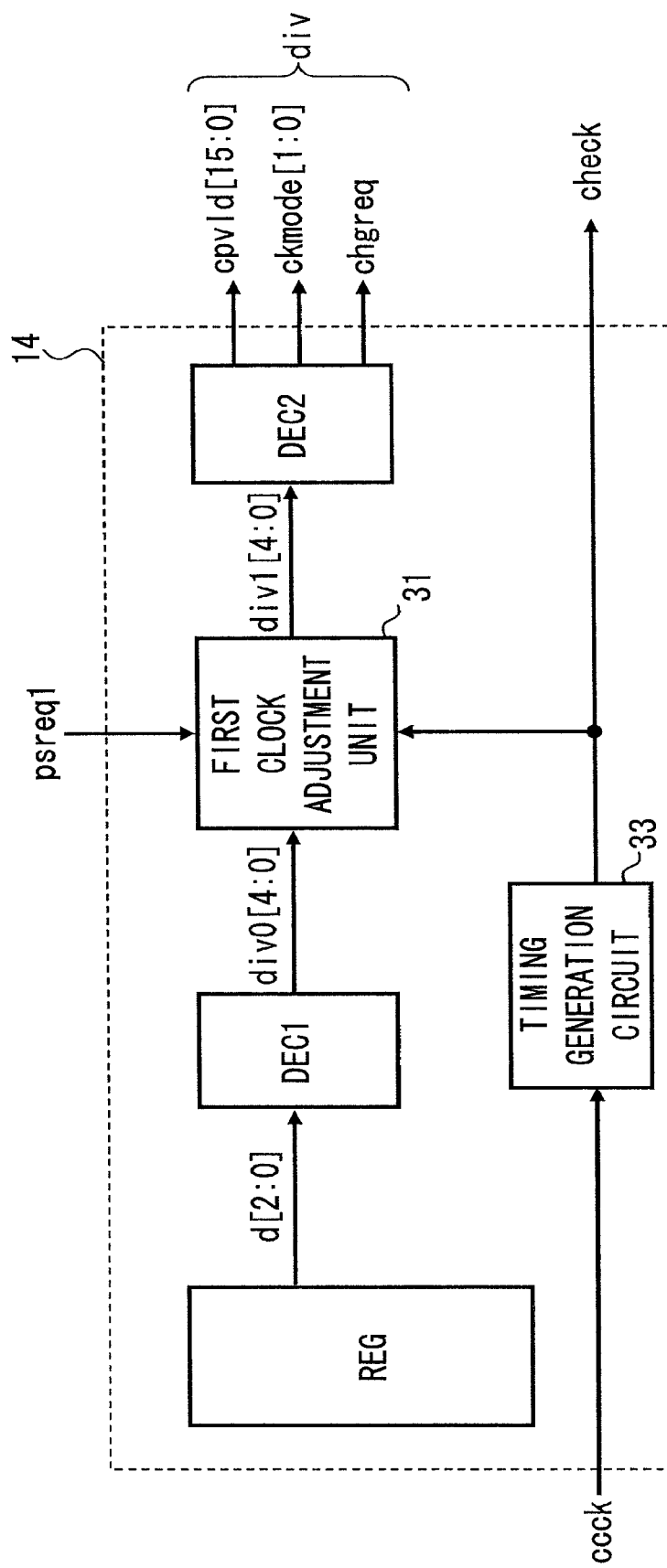
FIG. 22 is an enlarged view of a clock control circuit 14 according to a second embodiment.

FIG. 22 is an enlarged view of the clock control circuit 14 according to the second embodiment. In comparison to the clock control circuit 14 according to the first embodiment shown in FIG. 12, the clock control circuit 14 according to this embodiment shown in FIG. 22 does not include the second clock adjustment unit 32.

The other configuration is similar to that of the first embodiment, and therefore its explanation is omitted.

Similarly to the semiconductor device according to the first embodiment, the semiconductor device according to this embodiment includes the memory access detection unit 12 that can detect the number of accesses from each core to each memory area and thereby estimate the current consumption of the multi-core processor 11. Therefore, when this estimated current consumption exceeds a predetermined reference value, the semiconductor device can automatically lower the frequency of the clock signal cpuck supplied to the multi-core processor 11. As a result, it is possible to prevent the malfunction that would otherwise occur when the current value exceeds the permissible current value.

Figure 23:
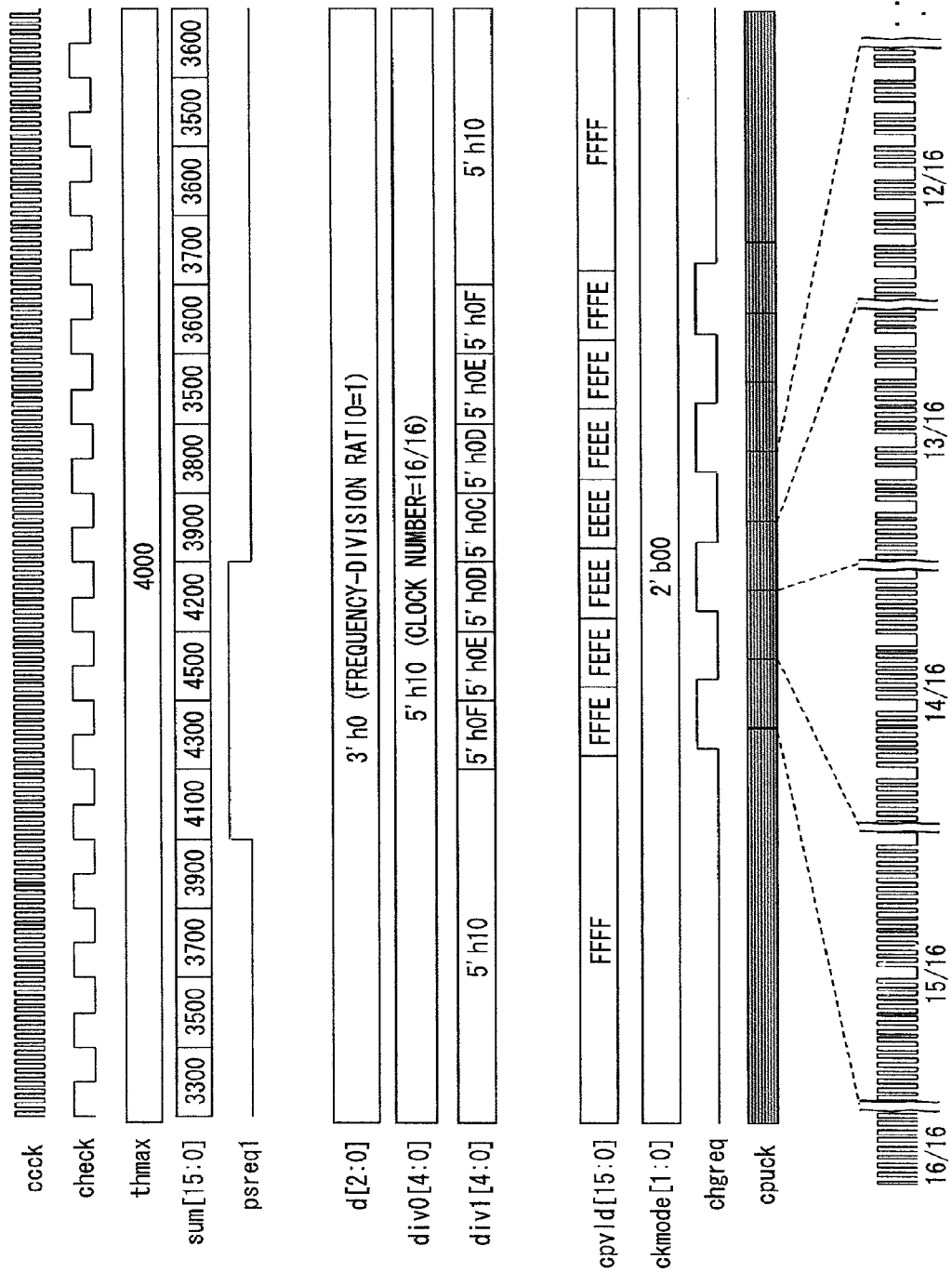
FIG. 23 is an example of a timing chart for explaining an overall operation of a clock frequency control circuit.

Next, an overall second clock frequency control operation is explained by using a timing chart shown in FIG. 23. FIG. 23 is an example of a timing chart for explaining an overall clock frequency control operation.

The clock signal ccck supplied to the clock control circuit 14 is shown in the first row of the chart.

The execution signal check is shown in the second row.

The maximum permissible value thmax[15:0] is shown in the third row. Note that thmax[15:0]=4000 in this example.

The total value sum[15:0] is shown in the fourth row. Its value is updated in response to rising edges of the execution signal check.

The request signal psreq1 is shown in the fifth row. The total value sum[15:0] exceeds the maximum permissible value thmax[15:0]=4000 and the request signal psreq1 is thereby at a High-level for four consecutive periods. In the other periods, the request signal psreq1 is at a Low-level.

The 3-bit digital signal d[2:0] indicating the frequency-division ratio is shown in the sixth row. In this example, the digital signal d[2:0]=3'h0, and the frequency-division ratio=1.

The 5-bit digital signal div0[4:0] indicating the frequency-division ratio is shown in the seventh row. In this example, the digital signal div0[4:0]=5'h10, and the number of clocks to be output (i.e., clock frequency)=16/16.

The 5-bit digital signal div1[4:0] output from the first clock adjustment unit 31 is shown in the eighth row. The first clock adjustment unit 31 checks the output level of the request signal psreq1 at falling edges of the execution signal check and updates the value of the digital signal div1[4:0]. Note that in response to the change in the request signal psreq1 where the request signal psreq1 is at a High-level for four consecutive periods, the value of the digital signal div1[4:0] decreases from 5'h10 to 5'h0C one at a time for four consecutive periods. After that, the digital signal div0[4:0] increases one at a time for four consecutive periods and is thereby restored to 5'h10.

The 16-bit clock valid signal ckvld[15:0] is shown in the ninth row (fifth row from the bottom).

The mode signal ckmode[1:0] is shown in the fourth row from the bottom.

Note that by changing the term "digital signal div2[4:0]" to "digital signal div1[4:0]" in the table showing the relation among the digital signal div2[4:0], the pulse valid signal cpvld[15:0], and the mode signal ckmode[1:0] shown in FIG. 13C, a table showing relation among the signals in this embodiment can be obtained. The clock valid signal ckvld[15:0] in the fifth row from the bottom and the mode signal ckmode[1:0] in the fourth row from the bottom have values according to the relation table shown in FIG. 13C.

The request signal chgreq is shown in the third row from the bottom. In this embodiment, the request signal chgreq is a toggle signal whose output level is changed whenever the value of the digital signal div1[4:0] changes.

The clock signal cpuck output from the frequency setting circuit DIV is shown in the second row from the bottom. The clock signal cpuck according to the values of the clock valid signal ckvld[15:0] and the mode signal ckmode[1:0] is output.

An enlarged view of the clock signal cpuck shown in the second row from the bottom is shown in the last row. As shown for the clock Nos. 12/16 to 15/16, the number of clocks to be output (i.e., clock frequency) is adjusted by thinning out clock pulses roughly uniformly from those of the maximum frequency, i.e., from those of the clock number 16/16.

<Third Embodiment>

Next, a semiconductor device according to a third embodiment is explained with reference to FIGS. 24 to 26.

Figure 24:
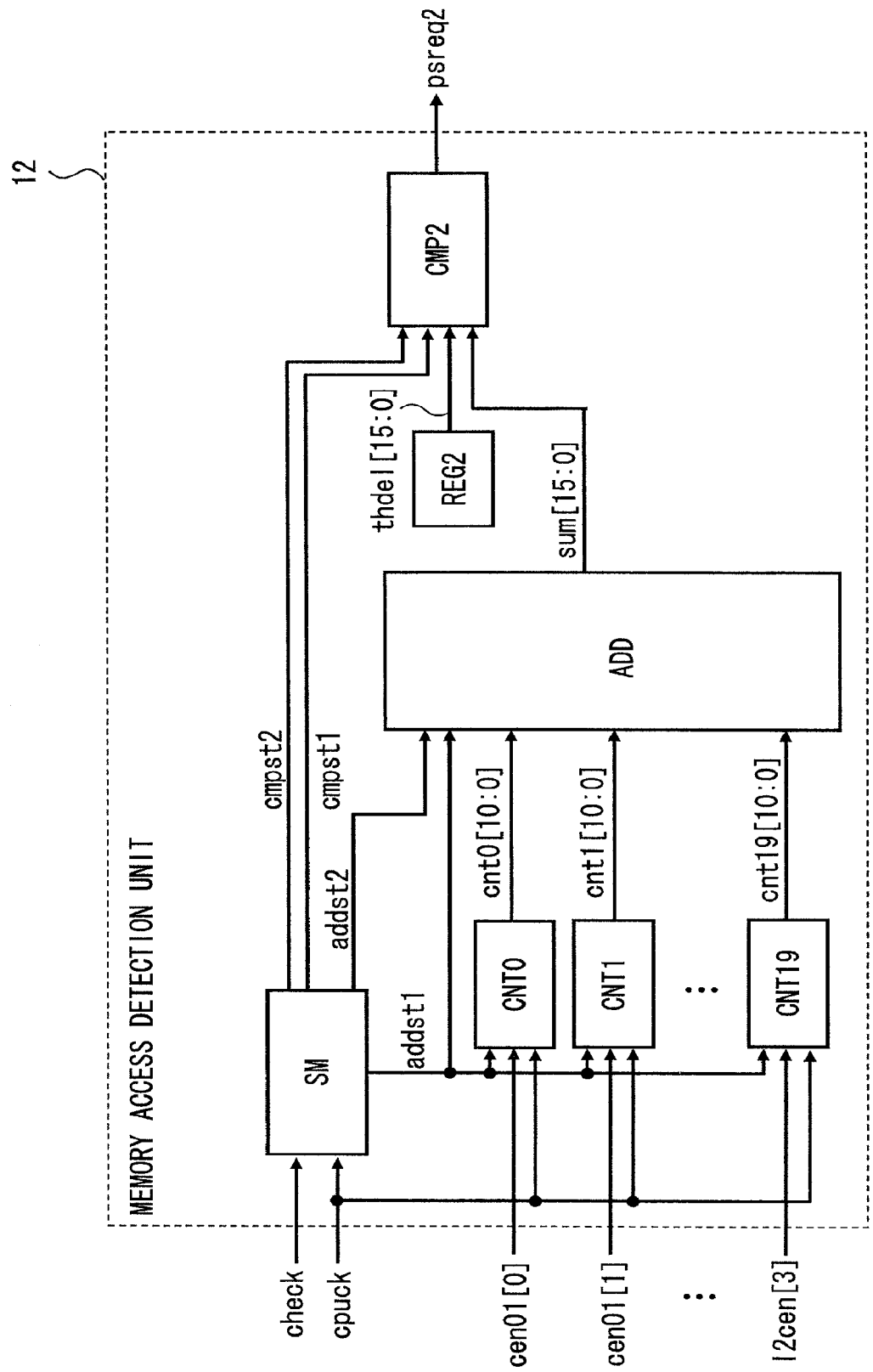
FIG. 24 is a circuit diagram of a memory access detection unit 12 according to a third embodiment.

FIG. 24 is a circuit diagram of a memory access detection unit 12 according to a third embodiment. In comparison to the memory access detection unit 12 according to the first embodiment shown in FIG. 6, the memory access detection unit 12 according to this embodiment shown in FIG. 24 does not include the digital comparator CMP1 and the register REG1.

Figure 25:
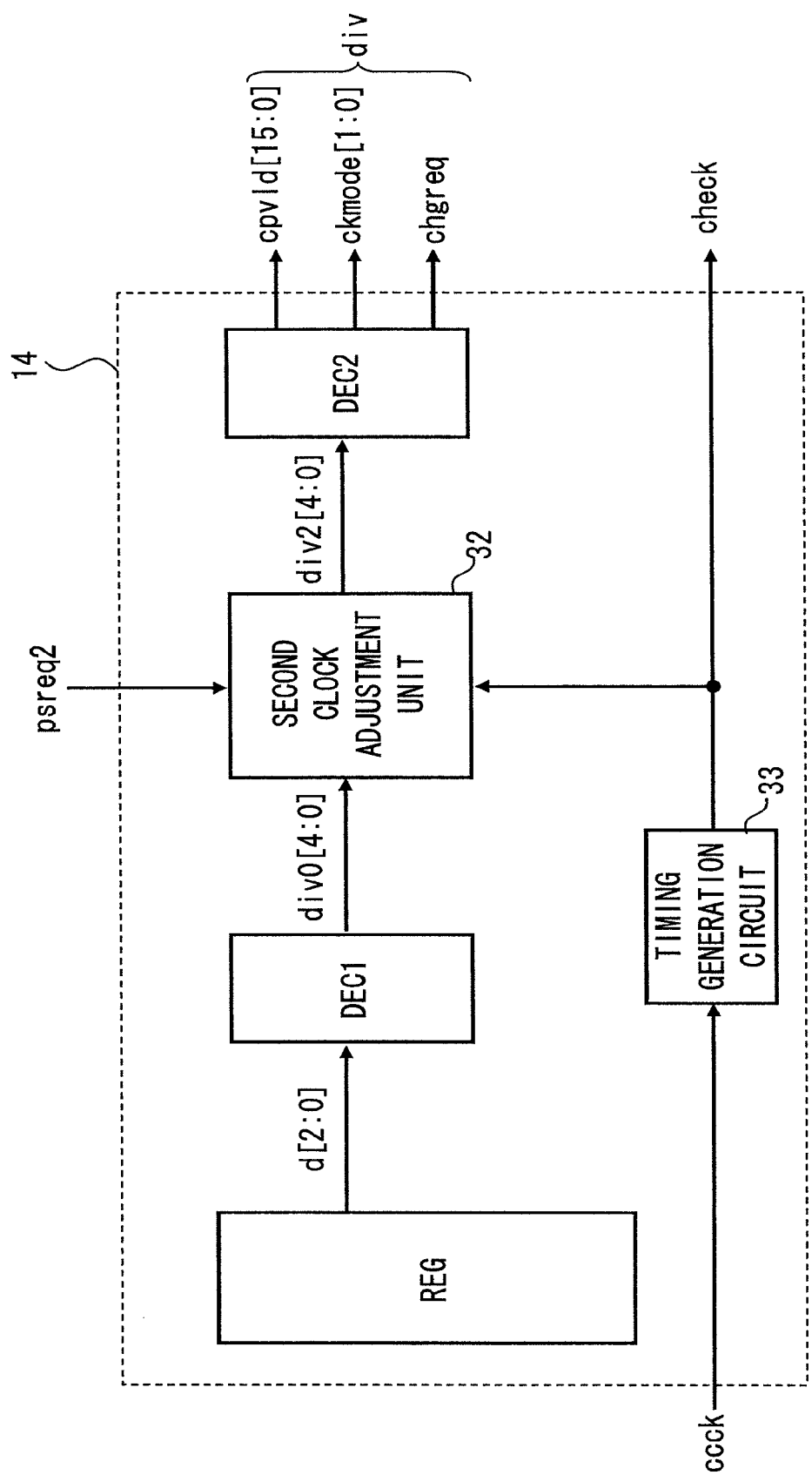
FIG. 25 is an enlarged view of a clock control circuit 14 according to a third embodiment.

FIG. 25 is an enlarged view of the clock control circuit 14 according to the third embodiment. In comparison to the clock control circuit 14 according to the first embodiment shown in FIG. 12, the clock control circuit 14 according to this embodiment shown in FIG. 25 does not include the first clock adjustment unit 31.

The other configuration is similar to that of the first embodiment, and therefore its explanation is omitted.

Similarly to the semiconductor device according to the first embodiment, the semiconductor device according to this embodiment includes the memory access detection unit 12 that can detect the number of accesses from each core to each memory area and thereby estimate the current consumption of the multi-core processor 11. Therefore, when this estimated current consumption exceeds a predetermined reference value, the semiconductor device can automatically lower the frequency of the clock signal cpuck supplied to the multi-core processor 11. Therefore, it is possible to effectively prevent the voltage drop that would be otherwise caused by a sudden increase of the current consumption.

Figure 26:
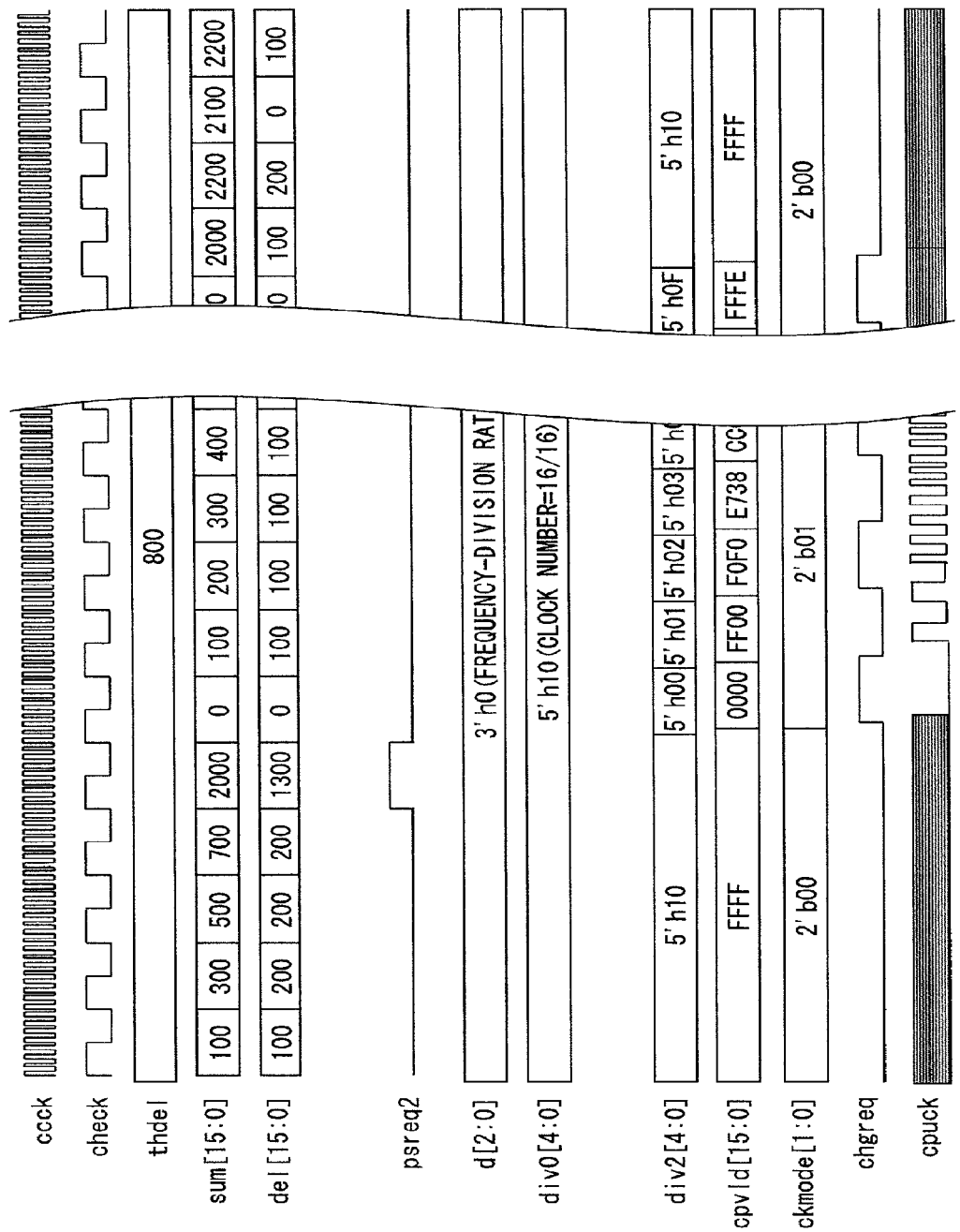
FIG. 26 is an example of a timing chart for explaining an overall operation of a clock frequency control circuit.

Next, an overall third clock frequency control operation is explained by using a timing chart shown in FIG. 26. FIG. 26 is an example of a timing chart for explaining an overall clock frequency control operation.

The clock signal ccck supplied to the clock control circuit 14 is shown in the first row of the chart.

The execution signal check is shown in the second row.

The permissible variation thdel[15:0] is shown in the third row. Note that thdel[15:0]=800 in this example.

The total value sum[15:0] is shown in the fourth row. Its value is updated in response to rising edges of the execution signal check.

The variation del[15:0] is shown in the fifth row. Its value is updated in response to rising edges of the execution signal check.

The request signal psreq2 is shown in the sixth row. In the period in which the variation del[15:0] is equal to 1300 and thus the variation del[15:0] exceeds the thdel[15:0]=800, the request signal pereq2 is at a High-level. In the other periods, the request signal pereq2 is at a Low-level.

The 3-bit digital signal d[2:0] indicating the frequency-division ratio is shown in the seventh row. In this example, the digital signal d[2:0]=3'h0, and the frequency-division ratio=1.

The 5-bit digital signal div0[4:0] indicating the frequency-division ratio is shown in the eighth row. In this example, the digital signal div0[4:0]=5'h10, and the number of clocks to be output (i.e., clock frequency)=16/16.

The 5-bit digital signal div2[4:0] output from the second clock adjustment unit 32 is shown in the ninth row. The second clock adjustment unit 32 checks the output level of the request signal psreq2 at falling edges of the execution signal check and updates the value of the digital signal div2[4:0]. Note that in response to the change in the request signal psreq2 where the request signal psreq2 becomes a High-level only for one period, the value of the digital signal div2[4:0] is changed from 5'h10 to 5'h00. Then, the value of the digital signal div2[4:0] is increased by one at a time in and after the next period, and is eventually restored to 5'h10.

The 16-bit clock valid signal ckvld[15:0] is shown in the tenth row (fourth row from the bottom).

The mode signal ckmode[1:0] is shown in the third row from the bottom. As shown in the table for the digital signal div2[4:0] shown in FIG. 13C, the values of the clock valid signal ckvld[15:0] and the mode signal ckmode[1:0] change according to the change of the digital signal div2[4:0].

The request signal chgreq is shown in the second row from the bottom. The request signal chgreq is a toggle signal whose output level is changed whenever the value of the digital signal div2[4:0] changes.

The clock signal cpuck output from the frequency setting circuit DIV is shown in the last row. The clock signal cpuck according to the values of the clock valid signal ckvld[15:0] and the mode signal ckmode[1:0] is output.

<Fourth Embodiment>

Next, a semiconductor device according to a fourth embodiment is explained with reference to FIG. 27.

Figure 27:
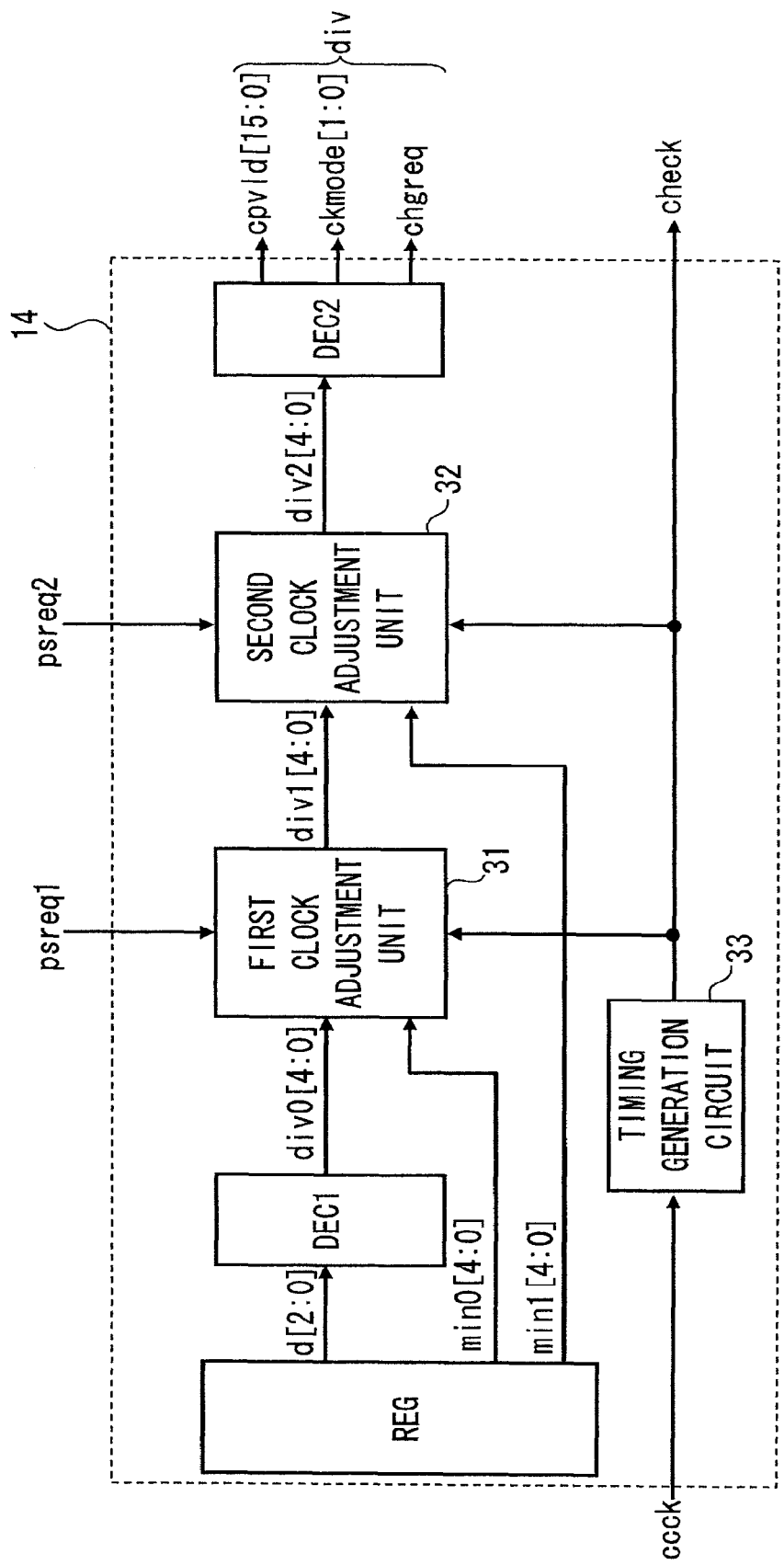
FIG. 27 is an enlarged view of a clock control circuit 14 according to a fourth embodiment.

FIG. 27 is an enlarged view of the clock control circuit 14 according to a fourth embodiment. In comparison to the clock control circuit 14 according to the first embodiment shown in FIG. 12, a 5-bit clock number lower limit value min0[4:0] is provided between the register REG and the first clock adjustment unit 31 in the clock control circuit 14 according to this embodiment shown in FIG. 27. Further, a 5-bit clock number lower limit value min1[4:0] is provided between the register REG and the second clock adjustment unit 32.

The lower limit value min0[4:0] is the lower limit value for the clock frequency adjustment performed in the first clock adjustment unit 31. In the first embodiment, no lower limit value is defined, so that even a value 5'h00, which corresponds to the clock number 0/16, can be set as the digital signal div1[4:0] output from the first clock adjustment unit 31. In this embodiment, when the min0[4:0] is set to a value 5'h08, for example, any value smaller than the value 5'h08 cannot be set as the digital signal div1[4:0] output from the first clock adjustment unit 31.

The lower limit value min1[4:0] is the lower limit value for the clock frequency adjustment performed in the second clock adjustment unit 32. In the first embodiment, no lower limit value is defined, so that even a value 5'h00, which corresponds to the clock number 0/16, can be set as the digital signal div2[4:0] output from the second clock adjustment unit 32. In this embodiment, when the min0[4:0] is set to a value 5'h08, for example, any value smaller than the value 5'h08 cannot be set as the digital signal div2[4:0] output from the second clock adjustment unit 32. The other configuration is similar to that of the first embodiment, and therefore its explanation is omitted.

By defining the lower limit value min0[4:0] for the clock frequency adjustment performed in the first clock adjustment unit 31 and the lower limit value min1[4:0] for the clock frequency adjustment performed in the second clock adjustment unit 32 in this manner, it is possible to adjust the width of the clock frequency adjustment as desired depending on the purpose or the like.

<Fifth Embodiment>

Next, a semiconductor device according to a fifth embodiment is explained with reference to FIG. 28.

Figure 28:
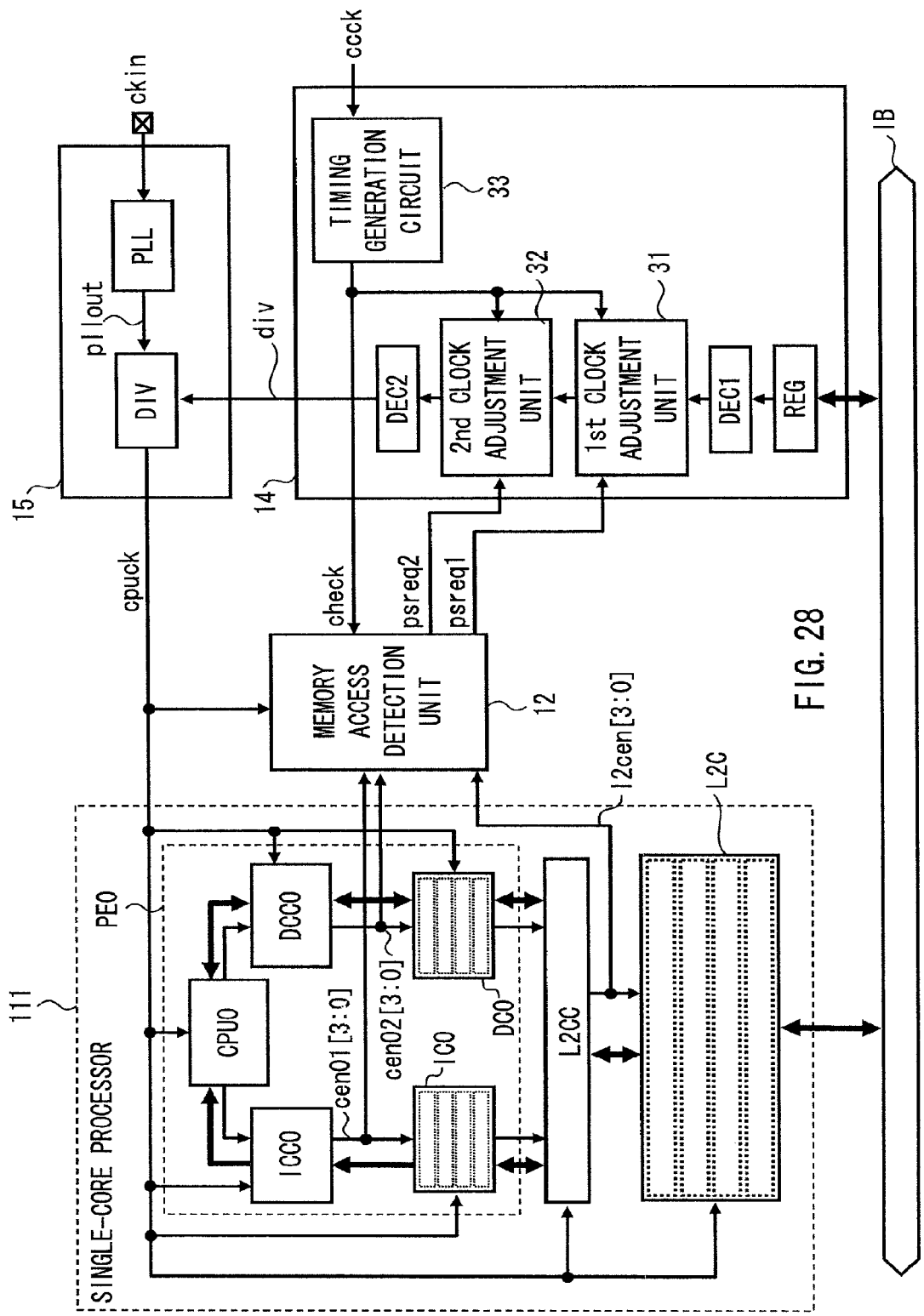
FIG. 28 shows a relation among a single-core processor 111, a memory access detection unit 12, a clock control circuit 14, and a clock generation circuit 15 according to a fifth embodiment in detail.

FIG. 28 shows a relation among a single-core processor 111, a memory access detection unit 12, a clock control circuit 14, and a clock generation circuit 15 according to a fifth embodiment in detail. The semiconductor device according to the fifth embodiment is different from the semiconductor device according to the first embodiment shown in FIG. 4 in that the multi-core processor 11 is replaced by a single-core processor 111.

Enable signals cen01, cen02 and 12cen, which are used to activate an instruction cache memory IC0, a data cache memory DC0, and a secondary cache memory L2C, are input to the memory access detection unit 12 according to this embodiment. The memory access detection unit 12 detects the number of activations (activation rate) of the input enable signals cen01, cen02 and 12cen, i.e., detects the number of accesses. Further, the memory access detection unit 12 calculates an estimated current consumption in the single-core processor 111 based on the number of accesses. The other configuration is similar to that of the first embodiment, and therefore its explanation is omitted.

Similarly to the other embodiments, the semiconductor device according to this embodiment includes the memory access detection unit 12 that can detect the number of accesses from the core to the memory area and thereby estimate the current consumption of the single-core processor 111. Therefore, when this estimated current consumption or its variation exceeds a predetermined reference value, the semiconductor device can automatically lower the frequency of the clock signal cpuck supplied to the single-core processor 111. As a result, it is possible to prevent the malfunction that would otherwise occur when the current value exceeds the permissible current value. Further, it is also possible to effectively prevent the voltage drop that would be otherwise caused by a sudden increase of the current consumption.

Further, the above-described embodiments are explained by using a mobile phone terminal as a principal example. However, the present invention can be also applied to a smart phone, a potable game terminal, a tablet PC, a laptop PC, and other radio communication terminals. The present invention can be also applied to other electronic devices having no radio communication function. Further, the present invention is not limited to the above-described embodiments, and needless to say, various modifications can be made without departing from the spirit and scope of the above-described present invention.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
    a clock generation circuit that generates a clock signal;
    an arithmetic circuit that operates according to the clock signal;
    a storage circuit that is activated according to access from the arithmetic circuit;
    a memory access detection unit that detects a number of accesses from the arithmetic circuit to the storage circuit and applies a weight to the number of accesses; and
    a clock control circuit that lowers the frequency of the clock signal when a variation of the weighted number of accesses exceeds a variation threshold.

2. The semiconductor device according to claim 1, wherein the weight is a value for one access.

3. A clock frequency control method for a clock signal supplied to a semiconductor device with an arithmetic circuit that operates according to the clock signal and a storage circuit that is activated according to access from the arithmetic circuit, the clock frequency control method comprising:
    detecting a number of accesses from the arithmetic circuit to the storage circuit;
    applying a weight to the number of accesses; and
    lowering a frequency of the clock signal when a variation of the weighted number of accesses exceeds a variation threshold.

4. The method according to claim 3, wherein the weight is a value for one access.

\* \* \* \* \*